(12) United States Patent
Mura et al.

(10) Patent No.: US 10,512,976 B2
(45) Date of Patent: Dec. 24, 2019

(54) CUTTING INSERT AND INDEXABLE ROTARY CUTTING TOOL

(71) Applicant: Mitsubishi Hitachi Tool Engineering, Ltd., Tokyo (JP)

(72) Inventors: Hisanori Mura, Narita (JP); Tadahiro Hibata, Narita (JP); Tomohiro Murata, Narita (JP); Masashi Noshita, Narita (JP)

(73) Assignee: MITSUBISHI HITACHI TOOL ENGINEERING, LTD., Tokyo (JP)

( * ) Notice: Subject to any disclaimer, the term of this patent is extended or adjusted under 35 U.S.C. 154(b) by 0 days.

(21) Appl. No.: 15/757,769

(22) PCT Filed: Sep. 25, 2015

(86) PCT No.: PCT/JP2015/077110
§ 371 (c)(1),
(2) Date: Mar. 6, 2018

(87) PCT Pub. No.: WO2017/051471
PCT Pub. Date: Mar. 30, 2017

(65) Prior Publication Data
US 2018/0339350 A1  Nov. 29, 2018

(51) Int. Cl.
B23C 5/20 (2006.01)
B23C 5/06 (2006.01)
B23C 5/10 (2006.01)

(52) U.S. Cl.
CPC .............. *B23C 5/207* (2013.01); *B23C 5/109* (2013.01); *B23C 5/06* (2013.01);
(Continued)

(58) Field of Classification Search
CPC ............ B23C 2200/44; B23C 2200/36; B23C 2210/045; B23C 5/06; B23C 2200/0494;
(Continued)

(56) References Cited

U.S. PATENT DOCUMENTS 5,193,947 A * 3/1993 Bernadic ............... B23B 27/143
                                                       407/114
5,460,464 A * 10/1995 Arai ....................... B23C 5/109
                                                       407/114
(Continued)

FOREIGN PATENT DOCUMENTS

CN  101011757 A  8/2007
CN  103025462 A  4/2013
(Continued)

OTHER PUBLICATIONS

Office Action dated Oct. 15, 2018, issued for the Chinese patent application No. 201580082581.0 and a partial English translation of the search report.
(Continued)

*Primary Examiner* — Sara Addisu
(74) *Attorney, Agent, or Firm* — Locke Lord LLP

(57) ABSTRACT

A detachable cutting insert for an indexable rotary cutting tool, has a cutting edge portion that includes a major cutting edge continuous with a first end of a first corner edge near a short-side-direction side surface, which is formed into a straight line. The cutting insert has a first minor cutting edge that is continuous with a second end of the major cutting edge, which is formed into a circular arc. The cutting insert has a second minor cutting edge that is continuous with a third end of the first minor cutting edge, which is formed into a straight line. In a cross-sectional view of a rake face of the second minor cutting edge, perpendicular to the second minor cutting edge, a cross-sectional ridgeline of the rake face of the second minor cutting edge is formed into a convex shape protruding above a cross-sectional ridgeline of a reference plane.

13 Claims, 18 Drawing Sheets

(52) U.S. Cl.
CPC ............. *B23C 2200/0494* (2013.01); *B23C 2200/208* (2013.01); *B23C 2200/28* (2013.01)

(58) Field of Classification Search
CPC .............. B23C 2200/208; B23C 5/207; B23C 2200/366; B23B 2200/208
See application file for complete search history.

(56) References Cited

U.S. PATENT DOCUMENTS

| | | | | |
|---|---|---|---|---|
| 5,904,450 | A * | 5/1999 | Satran | B23C 5/202 407/113 |
| 2004/0223818 | A1 * | 11/2004 | Sheffler | B23C 5/109 407/48 |
| 2006/0013661 | A1 * | 1/2006 | Long, II | B23B 27/1622 407/113 |
| 2010/0034602 | A1 | 2/2010 | Sung et al. | |
| 2010/0322732 | A1 | 12/2010 | Mergenthaler et al. | |
| 2011/0274506 | A1 * | 11/2011 | Kakai | B23C 5/109 407/40 |
| 2011/0299946 | A1 * | 12/2011 | Hecht | B23C 5/207 407/42 |
| 2012/0045289 | A1 * | 2/2012 | Ishi | B23C 5/06 409/132 |
| 2012/0057943 | A1 * | 3/2012 | Zastrozynski | B23C 5/06 407/30 |
| 2012/0087749 | A1 * | 4/2012 | Uno | B23C 5/06 407/42 |
| 2012/0189396 | A1 * | 7/2012 | Xu | B23C 5/06 409/132 |
| 2012/0275868 | A1 * | 11/2012 | Saito | B23C 5/06 407/42 |
| 2014/0161545 | A1 * | 6/2014 | Inagaki | B23B 27/1603 407/42 |
| 2014/0334890 | A1 * | 11/2014 | Takahashi | B23C 5/109 407/114 |
| 2015/0139743 | A1 * | 5/2015 | Ballas | B23C 5/109 407/48 |
| 2016/0158854 | A1 * | 6/2016 | Ishi | B23C 5/207 409/131 |
| 2016/0214186 | A1 * | 7/2016 | Mura | B23C 5/109 |
| 2017/0008100 | A1 * | 1/2017 | Oikawa | B23C 5/06 |
| 2017/0050249 | A1 * | 2/2017 | Oikawa | B23C 5/10 |
| 2017/0320146 | A1 * | 11/2017 | Ahnfeldt | B23C 5/109 |
| 2017/0326656 | A1 * | 11/2017 | Saji | B23C 5/109 |
| 2017/0326658 | A1 * | 11/2017 | Oikawa | B23C 5/109 |
| 2018/0015554 | A1 * | 1/2018 | Roman | B23C 5/109 |
| 2018/0036811 | A1 * | 2/2018 | Saji | B23C 5/109 |
| 2018/0133813 | A1 * | 5/2018 | Brunetto | B23C 5/207 |

FOREIGN PATENT DOCUMENTS

| | | |
|---|---|---|
| EP | 2397248 A1 | 12/2011 |
| EP | 2415544 A1 | 2/2012 |
| JP | 08-066815 A | 3/1996 |
| JP | 2002-066826 A | 3/2002 |
| JP | 2003-275920 A | 9/2003 |
| JP | 2006-528086 A | 12/2006 |
| JP | 2008-506541 A | 3/2008 |
| JP | 2011-510824 A | 4/2011 |
| JP | 2011-516292 A | 5/2011 |
| JP | 5007853 B2 | 8/2012 |
| JP | 2015-523228 A | 8/2015 |
| JP | 5967330 B1 | 8/2016 |
| JP | 2017-024173 A | 2/2017 |
| KR | 20090108905 A | 10/2009 |
| WO | 2004/101236 A2 | 11/2004 |
| WO | 2006/019480 A2 | 2/2006 |
| WO | 2009/128568 A1 | 10/2009 |
| WO | 2010/092807 A1 | 8/2010 |
| WO | 2010/114094 A1 | 10/2010 |
| WO | 2014/025158 A1 | 2/2014 |
| WO | 2017/051471 A1 | 3/2017 |

OTHER PUBLICATIONS

International Search Report dated Nov. 24, 2015, issued for PCT/JP2015/077110 and English translation thereof.
Notice of Allowance dated Jun. 7, 2016, issued for the Japanese patent application No. 2016-507323 and English translation thereof.
Office Action dated Jan. 9, 2018, issued for the Japanese patent application No. 2014-071873 and English translation thereof.
Korean Intellectual Property Office Decision for Grant of Letters Patent for Application No. 10-2018-7005588 dated Aug. 1, 2019.

* cited by examiner

CUTTING INSERT AND INDEXABLE ROTARY CUTTING TOOL

TECHNICAL FIELD

The present invention relates to a cutting insert in which, in a face milling performed on a workpiece, surface roughness of a machined surface is improved and a favorable machined surface can be obtained even in a high-feed ramping milling of a workpiece, and an indexable rotary cutting tool to which the cutting insert is detachably attached.

BACKGROUND ART

An indexable rotary cutting tool is practically used, in which a cutting insert made of cemented carbide (hereafter, referred to as "cutting insert") including a cutting edge is detachably attached to an insert mounting seat formed at a tip portion of a cutting tool for a milling using a clamp screw. This indexable rotary cutting tool has a plurality of the cutting inserts attached thereto, and thus can perform a high-efficiency cutting on a workpiece under a high-feed cutting conditions, for example, where a feed per tooth is set to be about 0.8 to 1.0 (mm/tooth) when the workpiece is carbon steel or the like.

However, in the high-feed cutting, a large load of the cutting (cutting force) is applied to the cutting insert, and thus there are some trouble where early wear of the rake face and the flank face of the cutting edge and chipping and fracture of cutting edge of the cutting insert occur, and thus quality of the machined surface is deteriorated and the tool life of the cutting insert is shortened.

Regarding the indexable rotary cutting tool to which the cutting insert is detachably attached to the insert mounting seat thereof, in order to improve the above-mentioned troubles, there are some proposals in the related art.

For example, an improvement for improving a chip disposability while retaining the stiffness of the cutting insert main body and the installation rigidity of the cutting insert by forming a concave-groove breaker on a rake face of a cutting insert (PTL 1); an improvement for increasing the strength of the tip portion of the tool by improving a shape, arrangement and the like of the cutting edge provided on the cutting insert (PTL 2); and an improvement for allowing the cutting insert to be stably attached to the insert mounting seat even in small indexable rotary cutting tool by contriving the shapes of the cutting insert and the cutting edge so as to provide the cutting insert with a sufficient size of a mounting face (PTL 3), are suggested.

The configurations of the above-mentioned improvements suggested in PTLs 1 to 3 are further described as follows.

PTL 1 (Japanese Unexamined Patent Application, First Publication No. 2003-275920) suggests an invention of a cutting insert (indexable insert) which is capable of machining a horizontal plane and a vertical wall with respect to a machined surface of a workpiece and in which the number of usable cutting edges in one cutting insert is increased.

In the cutting insert suggested in PTL 1, the cutting insert (insert main body) formed into a polygonal plate shape has: a top surface and a bottom surface (top and bottom surfaces) formed into a polygon as a rake face; a corner edge formed into a circular arc and formed at a corner portion shared with the top surface and the bottom surface; and a major cutting edge formed at a ridgeline portion of the top and bottom surfaces continuous to one end portion of the corner edge. On the other hand, a ridgeline portion of the top and bottom surfaces continuous to the other end portion of the corner edge is formed symmetrically with the major cutting edge about the bisector of the circular arc formed by the corner edge. Between the top and bottom surfaces of the cutting insert main body, the corner edge, the major cutting edge, and the ridgeline portion continuous to the other end portion of the corer edge of each of the top and bottom surfaces are arranged so as to be symmetrical with each other when the top and the bottom surfaces of the cutting insert main body are reversed.

In FIG. 11 of PTL 1, a configuration is suggested, in which a concave-groove breaker is formed on the top and bottom surfaces along the major cutting edge from the corner edge so as to avoid a periphery of the ridgeline portion at least near the corner edge. PTL 1 describes that this concave-groove breaker is provided in order to improve the chip disposability and surely retain the stiffness of the insert main body and the installation rigidity of the insert.

PTL 2 (Japanese Patent No. 5007853) suggests a cutting insert and an indexable cutting tool which can increase the strength of the tip portion of the tool.

The cutting insert disclosed in PTL 2 is a cutting insert including: two end surfaces having a main face which can be used as an attachment face to a tool main body; a periphery side surface extending between the two end surfaces; and a plurality of cutting edge portions formed at intersecting portion where the periphery side surface intersects with each of the end surfaces. A plurality of the cutting edge portions are arranged so as to have rotational symmetry around the first axis passing through the two end surfaces and have rotational symmetry around the second axis orthogonal to the first axis and passing through the periphery side surface. An intermediate plane orthogonal to the first axis and containing the second axis and passing through the periphery side surface is defined.

In the cutting insert disclosed in PTL 2, each of the cutting edge portion includes: a corner edge formed at a corner portion of corresponding end surface; a major cutting edge extending from one end of the corner edge so as to have a distance between the major cutting edge and the intermediate plane which is longer than a distance between the intermediate plane and the main face of the corresponding end surface; and a minor cutting edge extending from the other end of the corner edge so as to have a distance between the minor cutting edge and the intermediate plane which is longer than a distance between the intermediate plane and the main face of the corresponding end surface. PLT 2 describes that a concaved chip breaker is provided between each cutting edge and the main face of the end surface.

PTL 3 (Published Japanese Translation No. 2011-516292 of the PCT International Publication) discloses a cutting insert including: an upper surface and a lower surface positioned at opposite side to each other; and two longitudinal side surfaces and two transverse side surfaces connecting the upper surface and the lower surface, of which the length in the longitudinal direction is longer than that in the transverse direction. A penetrating hole penetrates through the center portions of the upper surface and the lower surface. The two longitudinal side surfaces are positioned at opposite side to each other and are perpendicular to the upper surface and the lower surface. The two transverse side surfaces are positioned at opposite side to each other and are perpendicular to the upper surface and the lower surface. On the upper surface and the lower surface, corner edges are provided at corners on one diagonal and chip discharge flutes are provided at corners on the other diagonal. A chip discharge flute extending along the transverse side surface is formed on each of the upper surface and the lower surface.

The chip discharge flute disclosed in PTL 3 includes: a chip discharge flute tilting downwardly toward one longitudinal side surface with respect to the longitudinal axis S2; and a chip discharge flute tilting upwardly toward the other longitudinal side surface.

On each of the upper surface and the lower surface, the corner cutting edges are formed at a pair of the corners on one diagonal among the four corners, and the two corners on which the corner cutting edges are formed protrude above the other corners on the upper surface or the lower surface.

CITATION LIST

Patent Literature

[PTL 1] Japanese Unexamined Patent Application, First Publication No. 2003-275920
[PTL 2] Japanese Patent No. 5007853
[PTL 3] Published Japanese Translation No. 2011-516292 of the PCT International Publication

SUMMARY OF INVENTION

Technical Problem

The above-mentioned PTL 1 discloses the cutting insert (indexable insert) formed into a polygonal plate shape and provided with: as the cutting edge, the linear major cutting edge connected with the corner edge; and the minor cutting edge connected with the other end portion of the major cutting edge and formed into a convex circular arc. In the front view of the cutting insert, the ridgeline of the cutting edge continuous with the major cutting edge and the minor cutting edge from the corner edge, has a constant distance from the bottom surface of the cutting insert.

Therefore, when the cutting insert is attached to the tool main body, the radial rake angle is a negative vale. Furthermore, when the cutting insert rotates during a cutting of a workpiece, in order to avoid an interference with the workpiece, the absolute value of the radial rake angle become large and thus it is difficult to reduce the cutting force. In addition, PTL 1 states that the region where the concave-groove breaker is formed is limited and that, in the shape of the top surface (3) of the cutting insert shown in FIGS. 11 to 16 of this patent literature, there is a region where the concave-groove breaker is not formed on the minor cutting edge (12). However, the region where the concave-groove breaker is not formed is a flat face, and thus PTL 1 discloses no technical means where the top surface (3) and the bottom surface (4) are formed in to a convex shape.

PTL 2 discloses the cutting insert in which the first corner edge connecting the linear major cutting edge and the minor cutting edge is a cutting edge formed into a circular arc. However, regarding the circular arc of the first corner edge, PTL 2 does not teach how to set the radius of the circular arc thereof. The cutting insert disclosed in PTL 2 includes the above-mentioned linear major cutting edge as an inner periphery cutting edge which is used to perform a ramping milling by a milling when the ramping milling is performed on a workpiece by the indexable rotary cutting tool to which the cutting insert is attached. However, the first corner edge, which is located at the lowest point of the tool main body when the cutting insert is attached to the tool main body, is formed into a small circular arc, and thus the stages are formed on the machined surface obtained by the milling to the workpiece. Therefore, using the cutting insert disclosed in PTL 2, it is difficult to improve the surface roughness of the ramping machined surface when the ramping milling is performed.

The cutting insert disclosed in PTL 3 is a cutting insert attached to a small cutter (tool main body) with a tool diameter of 16 mm to 40 mm. However, PTL 3 discloses no characterized configurations for successfully performing a ramping milling on a workpiece and for improving a surface roughness of the machined surface in a milling.

The cutting inserts disclosed in PTL 2 and PTL 3 each include a concaved portion on the breaker surface. Therefore, there is a technical problem where a vertical wall face is near the minor cutting edge arranged at the inner periphery side of the rotary tool, and thus this vertical wall face may cause clog of chips.

Accordingly, regarding a cutting insert detachably attached to an indexable rotary cutting tool for a milling, an object of the present invention is to provide a cutting insert in which machining conditions can be set to high-feed conditions during a ramping milling using a second minor cutting edge and a chip discharge performance can be improved, and an indexable rotary cutting tool to which the cutting insert is attached.

In addition, another object of the present invention is also to provide a cutting insert in which a surface roughness of a machined surface can be improved and a favorable surface roughness of a machined surface can be obtained even in a high-feed ramping milling of a workpiece, and an indexable rotary cutting tool to which the cutting insert is attached.

Solution to Problem

The cutting insert according to the first aspect of the present invention is a cutting insert including:
a top surface and a bottom surface each having long sides and short sides and each formed into substantially quadrilateral in a plan view of the top surface and the bottom surface, the bottom surface being arranged to be opposite to the top surface;
corner portions formed at four corners of each of the top surface and the bottom surface;
two long-side-direction side surfaces and two short-side-direction side surfaces which are side surfaces connecting the top surface and the bottom surface;
a clamp screw insertion hole penetrating from a center portion of the top surface to the bottom surface; and
cutting edge portions having cutting edges at intersecting ridgelines at which the top surface and the bottom surface intersect with the long-side-direction side surfaces and the short-side-direction side surfaces, in which
the cutting edge portions includes:
first corner edges formed at a pair of first corner portions among the four corners of each of the top surface and the bottom surface, the pair of the first corner portions being arranged so as to face each other across a center line of the clamp screw insertion hole;
major cutting edges connected with first end portions (S1) of the first corner edges near the short-side-direction side surface and each formed into a straight line along the intersecting ridgeline of the short-side-direction side surface;
first minor cutting edges connected with second end portions (S2) of the major cutting edges, each gently protruding toward outside of the short-side-direction side surface in the plan view of the top surface and the bottom surface, each extending away from the second end portion (S2) so as to gradually retract toward the clamp screw insertion hole with respect to an extended line of the major cutting edge, and each formed into a circular arc with a radius R; and second minor cutting edges connected with third end portions (S3) of the first minor cutting edges and each formed into a straight line, in which the top surface and the bottom surface each include a reference plane formed to include a circumference of an opening of the clamp screw insertion hole, and in which in a cross-sectional view of a rake face of the second minor cutting edge perpendicular to a ridgeline of the second minor cutting edge, a cross-sectional ridgeline of the rake face of the second minor cutting edges is formed into a convex shape protruding above the top surface or the bottom surface with respect to a cross-sectional ridgeline of the reference plane.

The second aspect of the present invention is the cutting insert according to the first aspect, in which the first corner edge, the major cutting edge, the first minor cutting edge, and the second minor cutting edge are smoothly continuous.

The third aspect of the present invention is the cutting insert according to the first or second aspect, in which the top surface and the bottom surface each include a breaker surface which constitutes a rake face of the cutting edge portion and is continuous with the reference plane, and an angle between the breaker surface and the reference plane near the first corner edge is smaller than that near the second minor cutting edge. In the third aspect, it is preferable that the angle between the breaker surface and the reference plane be increased stepwisely or gradually from the breaker surface near the first corner edge toward the breaker surface near the second minor cutting edge.

The fourth aspect of the present invention is the cutting insert according to any one of the first to third aspects, in which the top surface and the bottom surface each include a breaker surface which constitutes a rake face of the cutting edge portion and is continuous with the reference plane, and in the cross-sectional view of the rake face of the second minor cutting edge, an apex of the convex shape is on the second minor cutting edge, and an intersecting angle γ satisfies 70 (degrees)≤γ<90 (degrees) in which the intersecting angle γ is formed between a plane in the breaker surface and the short-side-direction side surface.

The fifth aspect of the present invention is the cutting insert according to the first aspect, in which the rake face of the second minor cutting edge is the reference plane.

The sixth aspect of the present invention is the cutting insert according to the first or fifth aspect, in which in the convex shape in the cross-sectional view of the rake face of the second minor cutting edge, an intersecting angle β satisfies 90 (degrees)<β≤130 (degrees) in which the intersecting angle β is formed between the short-side-direction side surface and a line segment (E1) connecting an apex (G) of the convex shape and the ridgeline of the second minor cutting edge.

The seventh aspect of the present invention is the cutting insert according to any one of the first, fifth, and sixth aspects, in which in the top surface or the bottom surface, a center portion of the first corner edge or a vicinity of the cutting edge including the center portion of the first corner edge is the highest in a thickness direction of the cutting insert, and in a front view of the cutting insert, the cutting edge portion is formed so as to continuously tilt downward to a predetermined position (Q) on the second minor cutting edge from the center portion of the first corner edge or from a vicinity of the first corner edge including the center portion of the first corner edge.

The eighth aspect of the present invention is the cutting insert according to any one of the first and the fifth to seventh aspects, in which a distance (L2) from the third end portion (S3) of the first minor cutting edge to the predetermined position (Q) on the second minor cutting edge satisfies L2<0.2×L1 in which L1 is a length of a chord of the first minor cutting edge formed into the circular arc.

The ninth aspect of the present invention is the cutting insert according to any one of the first and fifth to eighth aspects, in which the top surface and the bottom surface each include:

a breaker surface constituting rake faces of the first corner edge, the major cutting edge, and the first minor cutting edge; and the reference plane formed such that inclined surfaces are interposed at boundary portions between the reference plane and the breaker surface, and in the top surface or the bottom surface, the inclined surfaces are lower than the reference plane in a thickness direction of the cutting insert.

The tenth aspect of the present invention is the cutting insert according to any one of the first and fifth to ninth aspects, in which in a cross-sectional view of the cutting insert perpendicular to the first minor cutting edge, a cross-sectional ridgeline of the breaker surface protrudes above the top surface or the bottom surface with respect to the cross-sectional ridgeline of the reference plane.

The eleventh aspect of the present invention is an indexable rotary cutting tool including:

a tool main body; and the cutting insert according to any one of the first to tenth aspects detachably attached to an insert mounting seat formed at a tip portion of the tool main body by a fixing mean, wherein the cutting insert is attached to the insert mounting seat such that the short-side-direction side surface is disposed near a base surface of the tip portion of the tool main body and the long-side-direction side surface is disposed near an outer periphery surface of the tip portion of the tool main body.

Advantageous Effects of Invention

The cutting edge portions provided in the cutting insert of the present invention are each configured in a state where the corner edge, the major cutting edge formed into a straight line, the first minor cutting edge formed into a circular arc, and the second minor cutting edge formed in to a straight line are continuous in this order as one cutting edge. The indexable rotary cutting tool of the present invention to which the cutting insert of the present invention with such configuration is attached exerts the following effects.

The effect of the first aspect of the present invention is that, when the rake face near the second minor cutting edge is viewed in the cross-section thereof, this rake face is formed into a convex shape with respect to the reference plane, and thereby the chip discharge performance is improved and wear and deformation of the reference plane due to contact with chips or the like can be avoided in a ramping milling using the second minor cutting edge. Thus, since a concave portion and a vertical wall face are not present on the rake face near the second minor cutting edge, clog of the chips due to the vertical wall face can be avoid. As a result, the cutting force is reduced, and thus it is possible to reduce a chatter vibration of the tool and improve a surface roughness of the machined surface.

The effect of the second aspect of the present invention is that the end portions of the cutting edges (S1, S2 and S3) can be prevented from being preferentially worn since the cutting edges constituting each cutting edge portion are smoothly continuous. Thereby, the shape of the cutting edge portion is maintained for a long term and thus the cutting performance can be maintained.

The effect of the third aspect of the present invention is that chips generated during a cutting can be flowed to radially inward of the indexable cutting tool, since the breaker surface as the rake face of the cutting edge portion is configured so that the rake angle thereof near the first corner edge is small and that near the second minor cutting edge is large. Thereby, even in a cutting where the long-side-direction side surface of the cutting insert comes close to the vertical wall of a workpiece, the chips can be prevented from being involved between the vertical wall and the long-side-direction side surface.

The effect of the fourth aspect of the present invention is that the cutting force of the second minor cutting edge can be reduced, since the intersecting angle γ is set to be 70≤γ<90. Further, in the ramping milling using the second minor cutting edge, the chip discharge performance can be favorable.

The effects of the fifth and sixth aspects of the present invention are that the strength of the second minor cutting edge can be improved, since the rake face of the second minor cutting edge is formed into a convex shape with respect to the reference plane when the rake face of the second minor cutting edge is viewed from the cross-section thereof. Accordingly, since the fracture resistance of the edge tip is improved, high-feed conditions can be set in the ramping milling using a second minor cutting edge.

In the seventh aspect of the present invention, among the cutting edges constituting the cutting edge portion provided in the cutting insert, the center portion of the first corner edge or the vicinity of the cutting edge including the center portion is the highest in the thickness direction of the cutting insert in the top surface or the bottom surface. The cutting edge portion is formed so as to continuously tilt downward to a predetermined position (Q) (inflection point (Q)) on the second minor cutting edge from the center portion of the first corner edge or the vicinity of the first corner cutting edge including the center portion of the first corner cutting edge.

Thereby, when the cutting insert according to the seventh aspect of the present invention is attached and fixed to an indexable rotary cutting tool, the radial rake angle can be set to a positive angle, and thus, in a planar and ramping milling of the workpiece, it is possible to reduce the cutting force and prolong the tool life of the cutting insert. This effect is the effect of the seventh aspect of the present invention.

In addition, by positioning the inflection point (Q) on the second minor cutting edge, the first minor cutting edge formed into a circular arc and functioning as a wiper edge and the second minor cutting edge continuously tilt downward to the inflection point (Q). Thereby, when the cutting is performed using an indexable rotary cutting tool to which the cutting insert of the present invention is attached, it is possible to remove the convex portion remained on the surface of the workpiece by the wiper edge and improve the surface properties of the finished surface even in a case of increasing a feed per tooth, fz value. In particular, in the ramping milling, the surface roughness of the machined surface can be improved. This point is also the effect of the seventh aspect.

DESCRIPTION OF EMBODIMENTS (First Embodiment)

The first embodiment of the present invention is a cutting insert in which high-feed conditions can be set especially in a ramping milling of a workpiece using a second minor cutting edge and the chip discharge performance can be improved, and an indexable rotary cutting tool in which the cutting insert is detachably attached to a tool main body. According to the indexable rotary cutting tool of the present embodiment, the surface roughness of the machined surface is improved even in a high-feed cutting, and the favorable machined surface can be obtained even in the ramping milling of the workpiece. Thus, the present embodiment is particularly suitable for the indexable rotary cutting tool for a high-feed rough machining on the workpiece.

(Basic Configuration of Cutting Insert)

Figure 1:
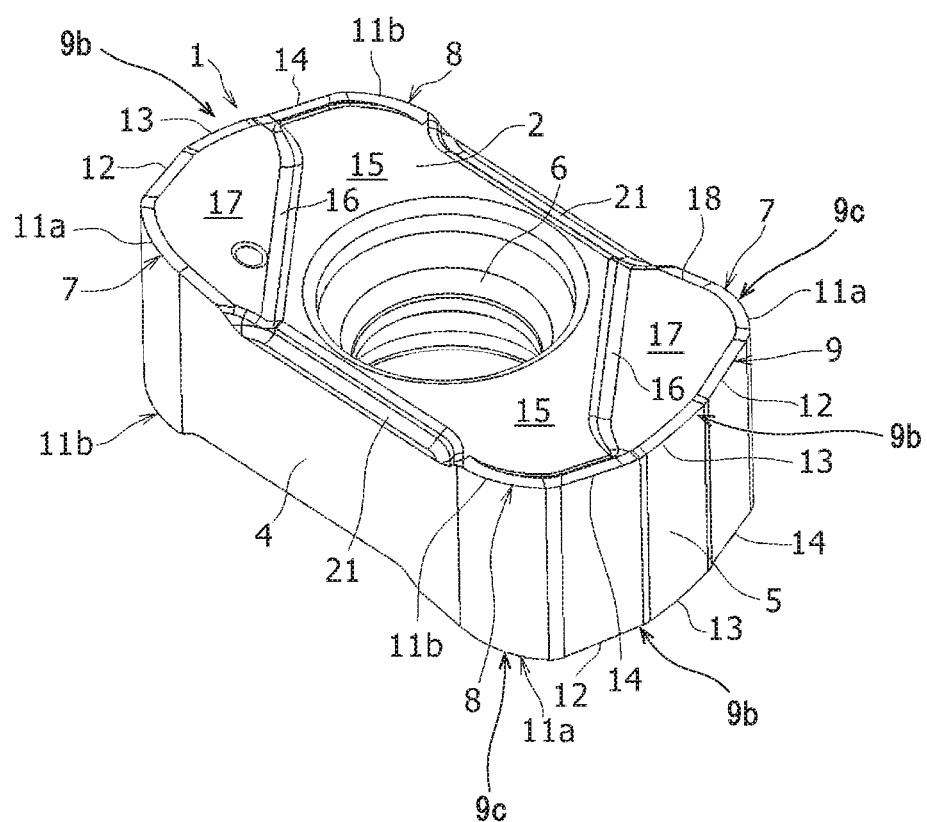
FIG. 1 is a perspective view of a cutting insert according to the first embodiment of the present invention which is viewed obliquely from up above a top surface thereof.
Figure 2:
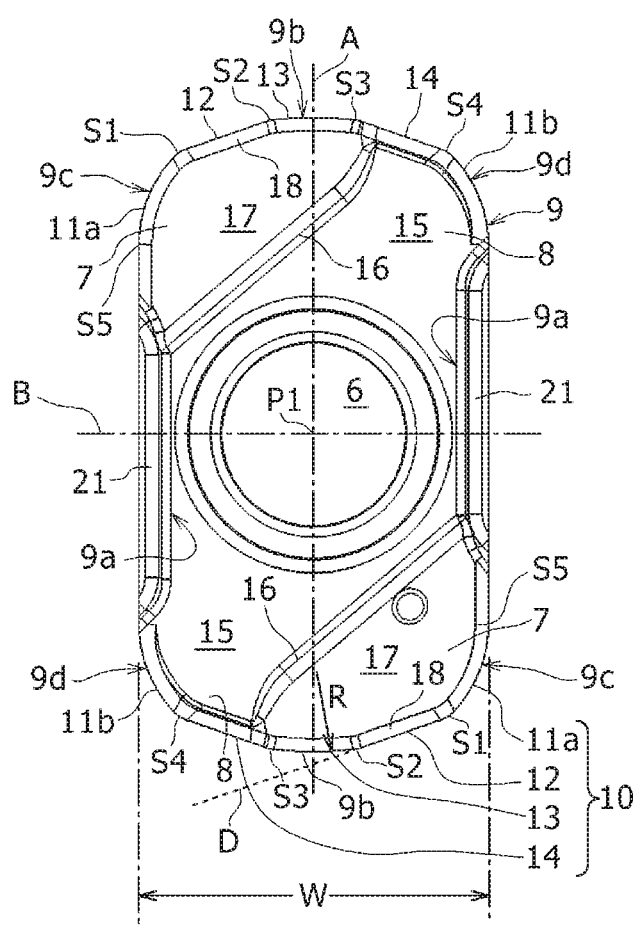
FIG. 2 is a plan view of the cutting insert shown in FIG. 1 which is viewed from the top surface thereof.
Figure 3:
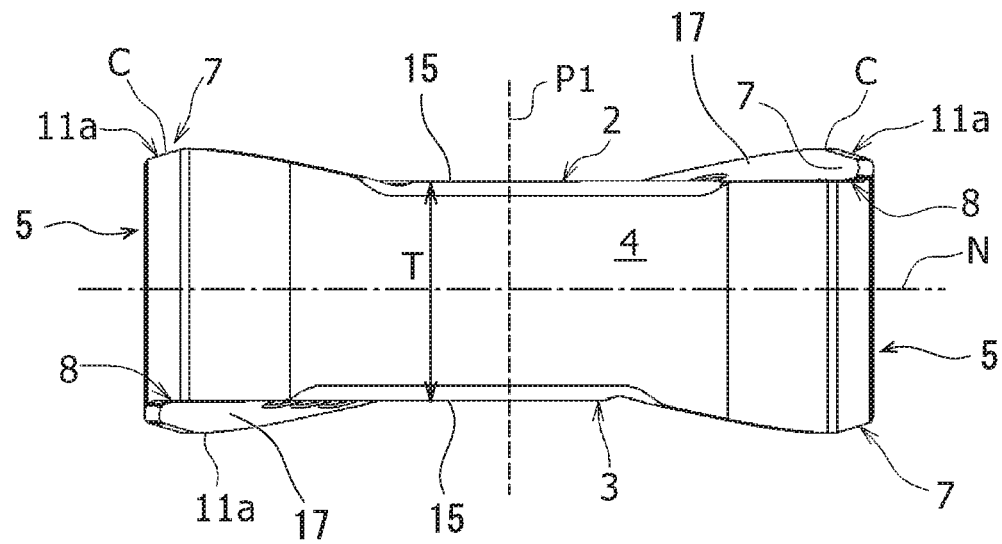
FIG. 3 is a side view of the cutting insert shown in FIG. 1 which is viewed from a long-side-direction side surface thereof.
Figure 4:
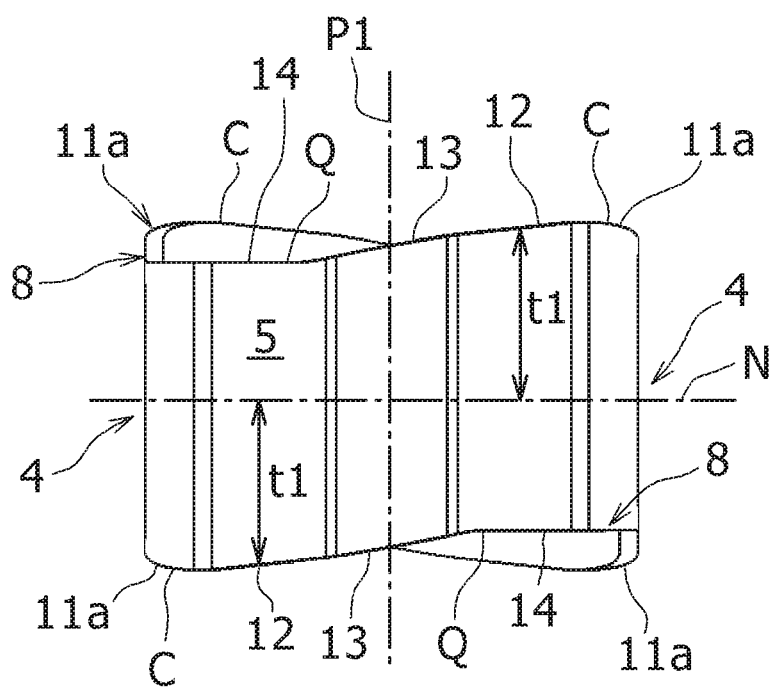
FIG. 4 is a front view of the cutting insert shown in FIG. 1 which is viewed from a short-side-direction side surface thereof.
Figure 5:
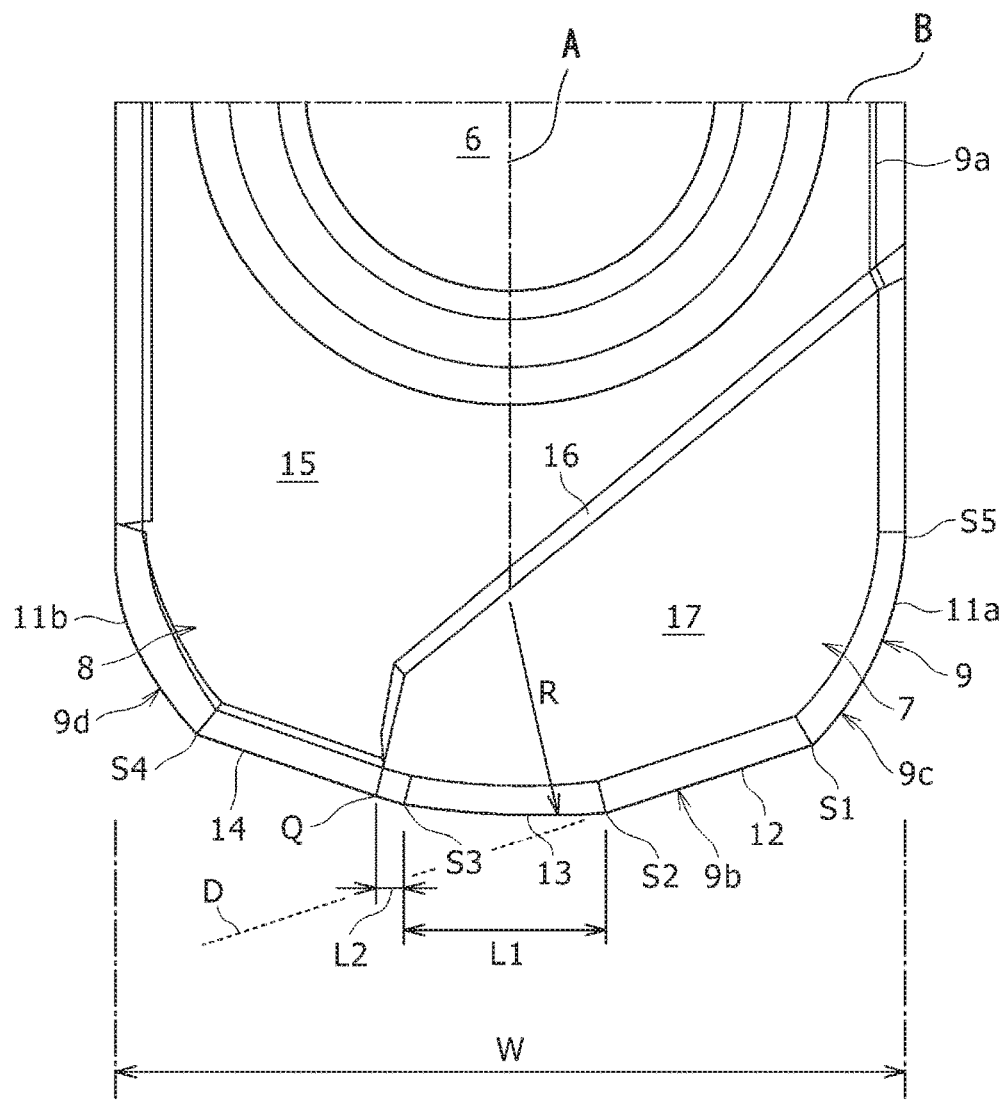
FIG. 5 is an enlarged partial plan view of the cutting insert shown in FIG. 2 showing a shape and an arrangement of each cutting edge constituting a cutting edge portion.

Hereafter, the basic configuration of the cutting insert according to the present embodiment will be described with reference to FIG. 1 to FIG. 5. FIG. 1 is a perspective view of a cutting insert according to the present embodiment which is viewed obliquely from up above a top surface thereof. FIG. 2 is a plan view showing a configuration of the top surface of the cutting insert 1 shown in FIG. 1. FIG. 3 is a side view of the cutting insert 1 shown in FIG. 1 which is viewed from a long-side-direction side surface adjacent to an intersecting ridgeline in a long-side direction. FIG. 4 is a front view of the cutting insert 1 shown in FIG. 1 which is viewed from a short-side-direction side surface thereof. FIG. 5 is an enlarged partial view of a cutting edge portion shown in FIG. 2 showing the configuration thereof, which shows the enlarged predetermined portion in FIG. 2. The cutting insert 1 of the present embodiment has a configuration of a so-called negative-type cutting insert.

As shown in FIG. 1 (FIG. 2), the cutting insert 1 is formed into substantially quadrilateral with short sides and long sides in the plan view thereof and has a plate-like shape in the thickness direction of the cutting insert 1. The basic configuration of the cutting insert 1 includes: a top surface 2; a bottom surface 3 arranged to be opposite to the top surface 2; two long-side-direction side surfaces 4, 4 parallel to each other and two short-side-direction side surfaces 5, 5 parallel to each other which are connected with the top surface 2 and the bottom surface 3 to form a side surface; and a clamp screw insertion hole 6 (hereafter, referred to as "screw insertion hole 6") penetrating from the center portion of the top surface 2 to the center portion of the bottom surface 3 and used for fixing the cutting insert 1.

The long-side-direction side surfaces 4, 4 are formed along the ridgelines of the long sides of the top surface 2 and the bottom surface 3. On the other hand, the short-side-direction side surfaces 5, 5 are formed along the ridgelines of the short sides of top surface 2 and the bottom surface 3. The top surface 2 and the bottom surface 3 have the same shape. The two long-side-direction side surfaces 4, 4 and the two short-side-direction side surfaces 5, 5 are formed to be perpendicular to the top surface 2 and the bottom surface 3.

In the plan view of the cutting insert 1, the dashed-dotted straight line A shown in FIG. 2 passes through the center line P1 of the screw insertion hole 6 and bisects the width (W) between the two short-side-direction side surfaces 5, 5. The dashed-dotted straight line B passes through the center line P1 of the screw insertion hole 6 and is orthogonal to the straight line A.

As shown in FIG. 1 (FIG. 2), first corner portions 7, 7 and second corner portions 8, 8 formed into a circular arc are formed at four corners, at which the short sides intersect with the long sides, of the top surface 2 formed into a substantially quadrilateral. Similarly, the first corner portions 7, 7 and the second corner portions 8, 8 formed into a circular arc are formed at four corners of the bottom surface 3. In the plan view of the top surface 2 or the bottom surface 3, each of the pair of the first corner portions 7, 7 and the pair of the second corner portions 8, 8 are formed so as to have the same shape and arranged on the diagonals passing through the center line P1 of the screw insertion hole 6 so as to face each other. That is, the first corner portions 7, 7 have a rotationally symmetric shape with each other around the center line P1. The second corner portions 8, 8 also have rotationally symmetric shape with each other around the center line P1.

As shown in FIGS. 1, 3 and 4, at the positions on the bottom surface 3 which face the first corner portions 7, 7 formed on the top surface 2, the second corner portions 8, 8 are formed. Similarly, at the positions on the bottom surface 3 which face the second corner portions 8, 8 formed on the top surface 2, the first corner portions 7, 7 are formed.

In the cutting insert 1 of the present embodiment, the cutting edges are formed at the portions described below, which are the intersecting ridgeline 9 at which the top surface 2 intersects with the short-side-direction side surfaces 5 and the long-side-direction side surfaces 4; and the intersecting ridgeline 9 at which the bottom surface 3 intersects with the short-side-direction side surfaces 5 and the long-side-direction side surfaces 4.

On the top surface 2, as shown in FIG. 2, the first corner edges 11a, 11a are formed on the circular-arc intersecting ridgelines 9c of the pair of the first corner portions 7, 7 arranged on the diagonal across the center line P1 of the screw insertion hole 6, among the four corners including the first corner portions 7, 7 and the second corner portions 8, 8. Similarly, the second corner edge 11b, 11b are formed on the circular-arc intersecting ridgelines 9d of the other pair of the second corner portions 8, 8. On the bottom surface 3 of the cutting insert 1, similar to the described-above, the pair of the first corner edges 11a, 11a and the pair of the second corner edges 11b, 11b are formed.

The cutting insert 1 according to the present embodiment has the configuration of the negative-type cutting insert, and thus the second corner edges 11b, 11b are not used as a cutting edge. Therefore, the cutting edge is not necessarily formed thereon. Accordingly, in the following descriptions, the above-described second corner edges 11b, 11b are referred to as the second corner ridgelines 11b, 11b.

In the cutting insert 1 of the present embodiment, a plurality of cutting edges are formed sequentially toward the second corner ridgeline 11*b* from one end portion (end portion (S1) shown in FIG. 2) of the first corner edge 11*a*, that is, from S1 on the intersecting ridgeline 9*b* near the short-side-direction side surface 5.

As shown in FIG. 2, these cutting edges are formed so that the major cutting edge 12, the first minor cutting edge 13, and the second minor cutting edge 14 are arranged in this order and are connected (continuous) with each other to be united. Since the first corner edge 11*a*, the major cutting edge 12, the first minor cutting edge 13, and the second minor cutting edge 14 are connected with each other as one cutting edge, in some cases in the following descriptions, these cutting edges are collectively referred to as "cutting edge portion 10." In addition, in some cases in the following descriptions, the above-described S1 is referred to as "first end portion of the first corner edge 11*a*."

Since the cutting insert 1 formed in to a substantially quadrilateral shape in the plan view has the configuration of the negative-type insert, each of the top surface 2 and the bottom surface 3 includes two cutting edge portions 10, and each of the cutting edge portions 10 of the top surface 2 and the bottom surface 3 are formed on the intersecting ridgelines 9*b*, 9*c* faces each other on the top and bottom surfaces as shown in FIG. 1.

Hereafter, the basic configurations of each cutting edge constituting the cutting edge portion 10 will be described. As shown in FIG. 2, the first corner edge 11*a* is formed into a circular arc with a predetermined radius. With the first end portion (S1) of the first corner edge 11*a*, the major cutting edge 12 formed into a straight line is connected. The straight-line major cutting edge 12 tilts at a predetermined angle with respect to the above-mentioned straight line B.

With a second end portion (S2) of the major cutting edge 12, the first minor cutting edge 13 formed into a circular arc with a radius R is connected. In the circular-arc first minor cutting edge 13, as enlarged and shown in FIG. 5, the circular arc is convex toward outward of the cutting insert 1. The circular arc of the first minor cutting edge 13 extends away from the connecting portion thereof with the major cutting edge 12 (the second end portion (S2) of the major cutting edge 12) so as to gradually retract toward the screw insertion hole 6 (close to the screw insertion hole 6) with respect to the extended line (D) of the straight-line major cutting edge 12. The reference "L1" shown in FIG. 5 is a length of the chord of the circular-arc first minor cutting edge 13, that is, the distance between the second end portion (S2) and a third end portion (S3).

When the cutting insert 1 is attached to the indexable rotary cutting tool 30 (see FIG. 9), the cutting insert is attached to the indexable rotary cutting tool 30 so that the lowest point of the indexable rotary cutting tool 30 in the direction of the rotational center axis O is located at a predetermined position on the circular-arc first minor cutting edge 13.

At the third end portion (S3) of the first minor cutting edge 13, the second minor cutting edge 14 formed into a straight line in the plan view is formed so as to tilt at a predetermined angle with respect to the direction of the straight line B. A fourth end portion (S4) of the second minor cutting edge 14 is connected to the second corner ridgeline 11*b* formed on the intersecting ridgeline (9*d*) of the second corner portion 8. With a fifth end portion (S5) of the first corner edge 11*a*, the intersecting ridgeline 9*a* along the long-side-direction side surface 4 is connected, and no cutting edge is formed on the intersecting ridgeline 9*a*. On the intersecting ridgeline 9*a*, a cutout portion 21 with a predetermined length along the intersecting ridgeline 9*a* is formed. The cutout portion 21 is provided for preventing the intersecting ridgeline 9*a* from contacting with the workpiece when the cutting insert 1 is attached to the indexable rotary cutting tool 30 and the cutting is performed on the workpiece.

The first corner edge 11*a*, the major cutting edge 12, the first minor cutting edge 13, and the second minor cutting edge 14 are connected with each other so as to form corners at the end portions S1 to S3 (connected non-smoothly). Therefore, when the cutting insert 1 is being attached to an insert mounting seat 32 of the tool main body 31 of the indexable rotary cutting tool 30 described later, it is possible to increase the contact area between the short-side contact surface 34 of the insert mounting seat 32 and the short-side-direction side surface 5 of the cutting insert 1. Thereby, the cutting insert 1 can be fixed more firmly to the insert mounting seat 32, and thus the chatter vibration of the tool during a cutting can be reduced.

Since the cutting insert 1 of the present embodiment has the configuration of the negative-type cutting insert, each cutting edge constituting the cutting edge portion 10 formed on the bottom surface 3 of the cutting insert 1 is formed so as to be the same shape as each cutting edge of the top surface 2 described above.

As shown in FIG. 1 (FIG. 2), the top surface 2 of the cutting insert 1 includes: a reference plane 15 formed so as to surround a circumference of the opening of the screw insertion hole 6 (so as to surround the screw insertion hole 6); and a breaker surface 17 formed from the reference plane 15 so as to interpose an inclined surface 16 therebetween. In this manner, the inclined surface 16 is formed at a boundary portion between the reference plane 15 and the breaker surface 17. The reference plane 15 is formed into a flat face and formed on a plane orthogonal to the long-side-direction side surface 4 and the short-side-direction side surface 5. Similar to the top surface 2, the bottom surface 3 of the cutting insert 1 includes: a reference plane 15; and a breaker surface 17 formed from the reference plane 15 so as to interpose an inclined surface 16 therebetween.

The breaker surface 17 has a height (see FIG. 3) in the thickness (T) direction of the cutting insert 1 (a distance from a plane N described later) which is larger slightly, for example, by approximately 0.2 to 0.3 mm than the reference plane 15.

Each of breaker surfaces 17 is formed to contain the corresponding first corner portion 7, 7 and provided so as to constitute common rake face of the first corner edge 11*a*, the major cutting edge 12, and the first minor cutting edge 13 among the cutting edges constituting the cutting portion 10 described above. In addition, each of the breaker surfaces 17 is formed into a planar inclined face extending from the corresponding first corner portion 7, 7 toward the inclined surface 16 to gradually tilt downward.

In the cutting insert 1 of the present embodiment, a predetermined position on the first corner edge 11*a* is the highest in the thickness (T) direction of the cutting insert 1 in the top surface 2 (bottom surface 3). It is preferable to set the predetermined position on the first corner edge 11*a* with the highest height in the thickness (T) direction to a center portion C of the first corner edge 11*a* (midpoint between the end portion (S1) and the end portion (S5)) or the vicinity of the center portion C. This state is shown in FIG. 3 and FIG. 4.

FIG. 3 an FIG. 4 show that the center portion (C) of the circular arc of the first corner edge 11*a* is the highest on the top surface 2 or the bottom surface 3 compared with the other region. The difference in height between the center portion C of the first corner edge 11a and the reference plane 15 is set to be approximately 0.2 to 0.3 mm.

The inclined surface 16 is formed into a inclined face tilting to a vicinity of third end portion (S3) of the second minor cutting edge 14 from the intersecting ridgeline 9a near the long-side-direction side surface 4 which is a vicinity of fifth end portion (S5) of the first corner edge 11a (a vicinity of the end portion of the cutout portion 21 near the first corner portion 7). The inclined face of the inclined surface 16 is a face tilting toward the center portion of the cutting insert 1. The reference numeral "18" shown in FIG. 1 and FIG. 2 indicates a honing formed along each cutting edge described above so as to have a predetermined width.

As shown in FIG. 1 (FIG. 2), in the cutting insert 1 of the present embodiment, the rake face of the second minor cutting edge 14 is not the breaker surface 17 but the reference plane 15. In the example shown in FIG. 2, the second minor cutting edge 14 is continuous with the reference plane 15 via the honing 18, and thus the vicinity of the second minor cutting edge 14 in the reference plane 15 continuous with the honing 18 functions as the rake face of the second minor cutting edge 14.

Next, the main characteristics of the cutting insert 1 of the present embodiment having the configuration of the above-described negative-type cutting insert 1, will be described in more detail.

(First Characteristics)

Figure 6A:
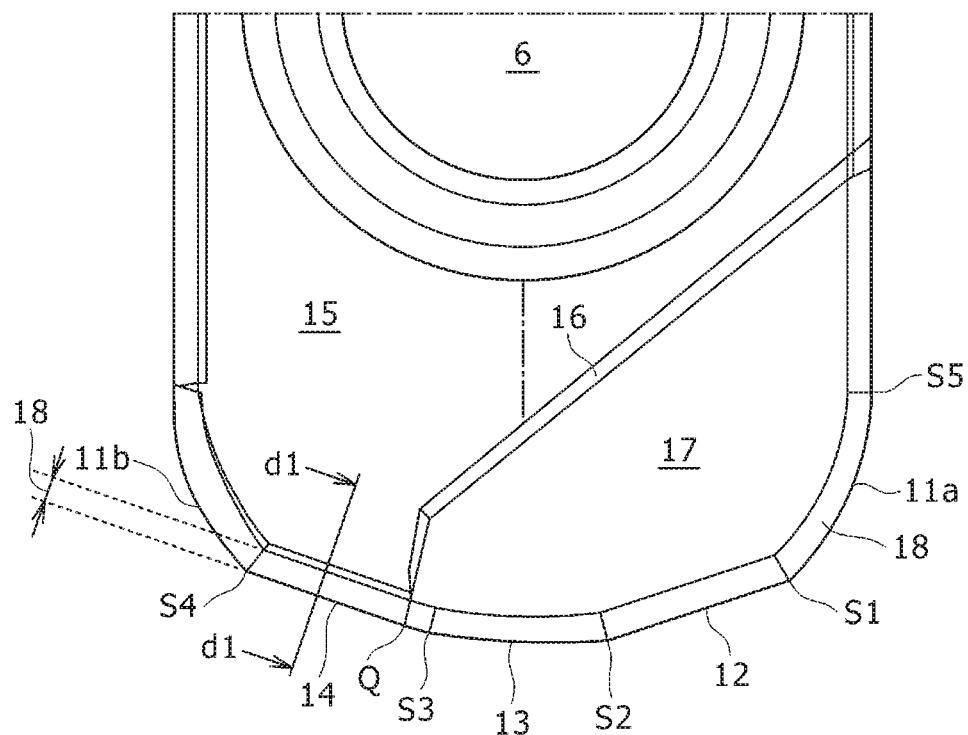
FIG. 6A is an enlarged partial plan view of the cutting insert shown in FIG. 2 showing the arrangement and an array of each cutting edge constituting the cutting edge portion.
Figure 6B:
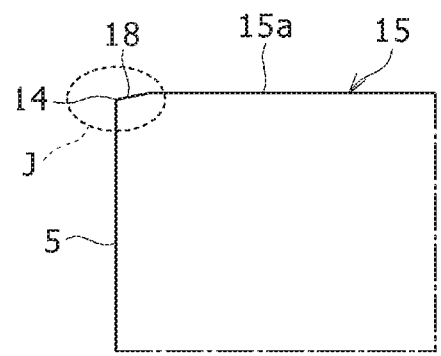
FIG. 6B is a cross-sectional view taken along a d1-d1 line shown in FIG. 6A.
Figure 6C:
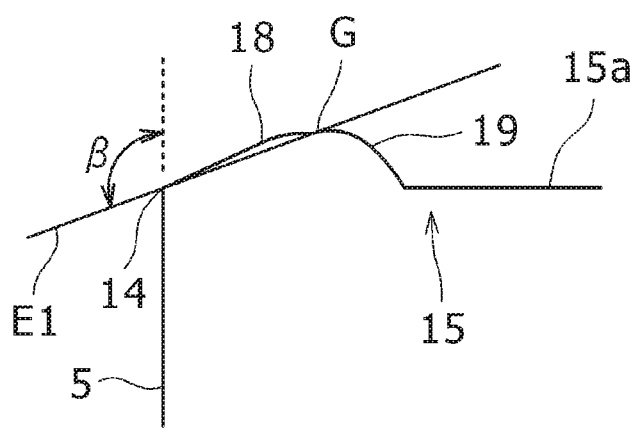
FIG. 6C is an enlarged view of inside of an ellipse (J) shown in FIG. 6B.
Figure 6D:
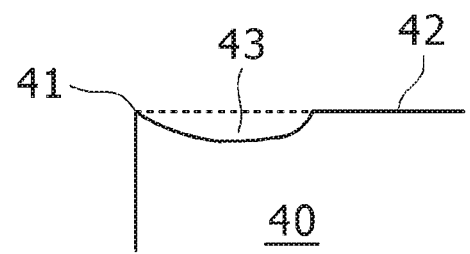
FIG. 6D shows a cross-section of a rake face of conventional cutting edge.

The cutting insert 1 of the present embodiment includes the following characteristics. The details of characteristics will be described with reference to FIG. 6A to FIG. 6D. FIG. 6A is an enlarged plan view of the cutting edge portion 10 of the cutting insert 1 and the vicinity thereof. FIG. 6B is a cross-sectional view taken along a d1-d1 line perpendicular to the second minor cutting edge 14 shown in FIG. 6A. FIG. 6C is an enlarged view of the inside of a dotted ellipse (J) shown in FIG. 6B. FIG. 6D shows a cross-section perpendicular to the major cutting edge of the conventional cutting insert (disclosed in FIG. 6 and FIG. 7 of PTL 2).

As shown in FIG. 6C in which the shape of the ridgeline in the above-mentioned cross-sectional view is enlarged, on a cross-sectional ridgeline 15a extending from the second minor cutting edge 14 to the surface of the reference plane 15, there is a small convex portion 19 gently protruding above the top surface 2. That is, the cross-sectional ridgeline of the rake face of the second minor cutting edge 14 is formed into a convex shape protruding above the top surface 2 or the bottom surface 3 (toward outward of the cutting insert 1) with respect to the cross-sectional ridgeline of the reference plane 15. This small convex portion 19 is formed by making the vicinity of the end portion of the reference plane 15 adjacent to the second minor cutting edge 14; or, as shown in FIG. 6C, the honing 18 adjacent to the second minor cutting edge 14 and the vicinity of the end portion of the reference plane 15 adjacent to this honing 18, be gently convex upward.

On the other hand, in the cross-section perpendicular to the major cutting edge 41 of the conventional cutting insert 40, as shown in FIG. 6D showing the shape thereof, in order to improve the chip discharge performance, the concave-groove chip breaker 43 is provided on the upper surface 42 of the cutting insert 40 so as to be adjacent to the major cutting edge 41. The concave-groove chip breaker 43 is formed so as to continuous with the corner edge, the major cutting edge, and the first cutting edge. When the concave-groove chip breaker 43 is provided, there is a probability in which the strength of each cutting edge may decrease and clog of chips due to the vertical wall of the concave groove may occur.

In the cutting insert 1 of the present embodiment, as described above, the convex portion 19 slightly protruding from the vicinity of the second minor cutting edge 14 is provided. Thereby, it is possible to retain the strength of the second minor cutting edge 14 in the ramping milling of the workpiece. In addition, by the small convex portion 19, the surface of the reference plane 15 is prevented from being worn. Thereby, it is possible to prevent chipping and fracture of the second minor cutting edge 14 from occurring at an early stage, and thus obtain a favorable machined surface without unevenness.

In the cutting insert 1, as shown in FIG. 6C, when an intersecting angle between a line segment (E1) connecting the apex (G) of the convex portion 19 with the second minor cutting edge 14 and the extended line of the short-side-direction side surface 5 is referred to as $\beta$ (degree), it is preferable to set the intersecting angle ($\beta$) to be "$90 < \beta \leq 130$." In some cases, the intersecting angle $\beta$ is referred to as a wedge angle.

The reason why the above-mentioned intersecting angle ($\beta$) is set to be "$90 < \beta \leq 130$" is as follows.

Since the intersecting angle $\beta$ is an obtuse angle exceeding 90 degrees, it is possible to obtain an effect for improving the cutting edge strength of the second minor cutting edge 14. By setting the upper limit of the $\beta$ value to 130 degrees or less, it is possible to lower an angle where the chips generated by the second minor cutting edge 14 contact with the reference plane 15 as the rake face.

Accordingly, by setting the $\beta$ value of the intersecting angle to be in the range of $90 < \beta \leq 130$ (degrees), the control can be conducted so as to reduce an area where chips contact with the reference plane 15. As a result, the chip discharge performance can be improved, and wear of the reference plane 15 can be prevented. Thereby, it is possible to improve the cutting edge strength of the second minor cutting edge 14 and prevent the cutting force from increasing. The cutting edge strength can be adjusted adequately by the $\beta$ value. Here, $\beta$ (degree) is preferably $93 \leq \beta \leq 120$, and more preferably $94 \leq \beta \leq 110$.

In some cases in the following descriptions, the above-described characteristics regarding the cross-sectional shape perpendicular to the second minor cutting edge 14 is referred to as "the first characteristics of the first embodiment."

(Second Characteristics)

In addition, the cutting insert of the present embodiment has the following characteristics. As shown in FIG. 3 (FIG. 4), in the top surface 2 and the bottom surface 3, the cutting edge portion 10 constituting one continuous cutting edge, that is, the first corner edge 11a, the major cutting edge 12, the first minor cutting edge 13, and the second minor cutting edge 14 are formed so as to continuously tilt downward to the predetermined position (Q) on the second minor cutting edge from the center portion (C) of the first corner edge 11a. The configurations where the cutting edge portion 10 tilts downward as described above will be described in detail.

That is, as shown in FIG. 4, it is preferable to form each cutting edge of the cutting edge portion 10 so that a distance (t1, height in the thickness direction of the cutting insert 1) between a plane (N) bisecting the cutting insert 1 in the thickness (T) direction and an arbitrary point on each cutting edge constituting the cutting edge portion 10 is the maximum at the center portion (C) of the corner edge 11 (or the vicinity of the center portion C) and decreases continuously and gradually from the center portion (C) to the predetermined position (Q) on the second minor cutting edge 14. It is preferable that the above-mentioned distance (t1) is constant without decrease from the predetermined position (Q) on the second minor cutting edge 14 to the end portion (S4) of the second corner ridgeline 11*b* of the second corner portion 8.

In the following description, the above-mentioned predetermined position (Q) on the second minor cutting edge 14 is referred to as "inflection point Q."

In order to achieve the configuration where the cutting edge portion 10 tilts downward, as described above, it is preferable to form the breaker surface 17 into a plane tilting downwardly toward the inclined surface 16 from the center portion (C) of the first corner edge 11*a* or from the vicinity of the cutting edge including the center portion (C) (a position on the cutting edge which is vicinity of the center portion (C)), accompanied with the cutting edge portion 10 gradually tilting downward.

In some cases in the following description, the characteristics regarding the cutting edge portion 10 gradually tilting downward are referred to as "the second characteristics of the first embodiment."

The cutting insert 1 of the present embodiment has the second characteristics and thus exerts the following effects.

When the cutting insert 1 is attached and fixed to the indexable rotary cutting tool 30, the rake angle in the radial direction of the indexable rotary cutting tool 30 can be set to be positive. Therefore, it is possible to obtain an effect for reducing the cutting force applied to the major cutting edge 12. Thereby, the tool life of the cutting insert 1 can be extended.

By disposing the described-above inflection point (Q) on the second minor cutting edge 14, the circular-arc first minor cutting edge 13 can be functioned as a wiper edge. Therefore, in the cutting of the workpiece, it is possible to obtain an effect for making the surface properties of the machined surface be favorable. Accordingly, it is preferable to arrange the above-mentioned inflection point (Q) on the second minor cutting edge 14.

(Third Characteristics)

In the cutting insert 1 of the present embodiment, when the inflection point (Q) on the second minor cutting edge 14 is located to be separated from the third end portion (S3) of the first minor cutting edge 13 by a distance (L2), the distance (L2) is preferably set so as to satisfy "L2<0.2×L1." L1 indicates the above-mentioned length (L1) of the chord of the first minor cutting edge 13. In some cases in the following description, the characteristics where the distance (L2) is set as described above is referred to as "the third characteristics of the first embodiment."

In the above-described third characteristics of the present embodiment, the reason why it is preferable to set the distance (L2) to be less than 0.2 times the length (L1) of the chord of the first minor cutting edge 13, that is, to set the position of the inflection point (Q) to be on the second minor cutting edge 14 as the vicinity of the third end portion (S3), is as follows.

The first reason is because the position of the inflection point (Q) is set to be on the second minor cutting edge 14 to avoid that the inflection point (Q) is on the first minor cutting edge 13, and thereby the first minor cutting edge 13 effectively functions as the wiper edge. Thereby, during the planar milling, even when fz value as the feed per tooth is increased, it is possible to remove the concave portions remained on the surface of the workpiece by the wiper edge and to improve the surface properties on the finished surface. The lowest point of the cutting edge of the cutting tool (see FIG. 10) is provided on the first minor cutting edge 13, and the region at inner periphery side of the lowest point functions as the wiper edge. The "lowest point" is the point positioned at the tip of the cutting tool (indexable rotary cutting tool 30) including the cutting edge in the direction of the rotational axis O.

The second reason why it is preferable to set the position of the inflection point (Q) to be on the second minor cutting edge 14 as the vicinity of the third end portion (S3) of the first minor cutting edge 13, is because this is effective for improving the chip discharge performance in the ramping milling using the second minor cutting edge 14. Thereby, an effect for reducing the cutting force can be obtained, and thus it is possible to reduce the chatter vibration of the tool and improve the surface roughness of the machined surface. On the other hand, when the inflection point (Q) is located to be separated from the end portion (S3) of the first minor cutting edge 13, the chip discharge performance is deteriorated due to the inclined surface (16). L2 is preferably $0.05 \times L1 \leq L2$ and more preferably $0.10 \times L1 \leq L2 \leq 0.15 \times L1$, but it is not limited thereto.

(Fourth Characteristics)

Figure 7A:
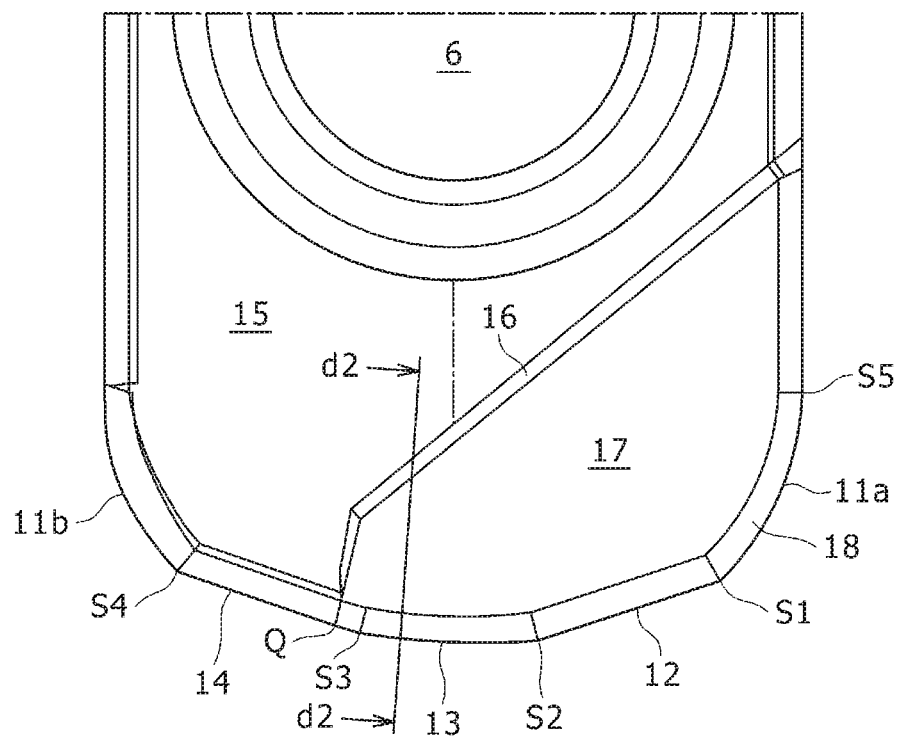
FIG. 7A is an enlarged partial plan view of the cutting insert shown in FIG. 2 showing a configuration and the array of each cutting edge constituting the cutting edge portion.
Figure 7B:
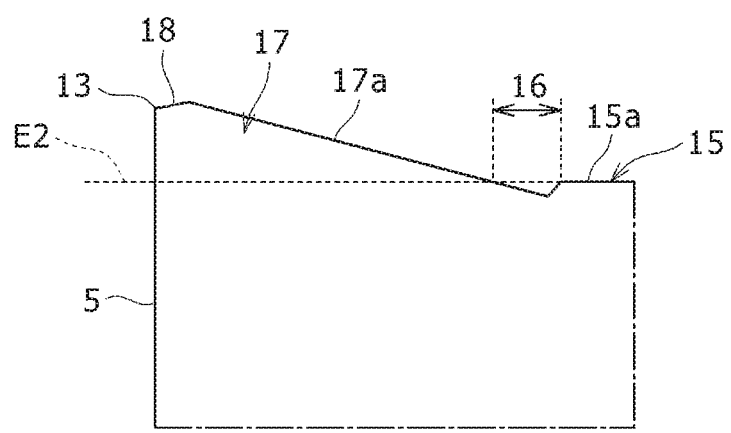
FIG. 7B is a cross-sectional view taken along a d2-d2 line shown in FIG. 7A.

In addition, the cutting insert 1 of the present embodiment has the following characteristics. The characteristics will be described with reference to FIG. 7A and FIG. 7B. FIG. 7A is an enlarged plan view of the cutting edge portion 10 and the vicinity thereof in the cutting insert 1. FIG. 7B is a cross-sectional view taken along a d2-d2 line perpendicular to the first minor cutting edge 13 showing FIG. 7A.

As shown in FIG. 7B, it is preferable that the cross-sectional ridgeline 17*a* of the breaker surface 17 on the top surface protrudes above the extended line (E2) of the cross-sectional ridgeline 15*a* of the reference plane 15 on the top surface such that the closer to the first minor cutting edge 13, the larger the protruding amount is. On the top surface 2 or the bottom surface 3, the inclined surface 16 is lower than the reference plane 15 in the thickness direction of the cutting insert 1. In some cases in the following description, the above-described characteristics are referred to as "the fourth characteristics of the first embodiment."

Since the cutting insert 1 of the present embodiment includes the fourth characteristics of the present embodiments, the following effect can be exerted.

The cutting ridgeline of the cutting edge portion 10 tilts downward from the center portion (C) of the first corner edge 11*a* to the inflection point (Q). However, since it is possible to retain the thickness of the cutting insert 1 in the thickness (T) direction on the first minor cutting edge 13, the honing 18 near the minor cutting edge 13, and the breaker surface 17, the strength of the minor cutting edge 13 can be retained. In addition to this, since the breaker surface 17 tilts downwardly toward the inclined surface 16, the discharging performance of chips generated by the first minor cutting edge 13 is favorable.

Since, on the top surface 2 or the bottom surface 3, the inclined surface 16 is lower than the reference plane 15 in the thickness (T) direction of the cutting insert 1, the following effects can be exerted.

When the cutting is performed on the workpiece using the indexable rotary cutting tool 30 to which the cutting insert 1 is attached, the chips generated by the cutting edge portion 10 and discharged is sent to radially outward the indexable rotary cutting tool 30 through the inclined surface 16. Therefore, it is possible to prevent the chips from directly contacting with the reference plane 15. That is, wear and deformation of the reference plane 15 due to contact with chips or the like can be avoided. Thereby, when the cutting is performed using the cutting edge portion 10 formed on the top surface 2 of the cutting insert 1, the cutting insert 1 is reversed and attached again, and then the cutting is performed using the cutting edge portion 10 formed on the bottom surface 3, the shape of the reference plane 15 on the top surface 2 of the cutting insert 1 is maintained. Accordingly, when the cutting insert 1 is attached again to the insert mounting seat 32 of the indexable rotary cutting tool 30, the shape of the reference plane 15 of the top surface 2 is maintained in an initial state, and thus the cutting insert 1 can be restrained to the insert mounting seat 32 in a normal state.

Additionally, it is desirable that the cutting insert 1 of the present embodiment include the following characteristics. The characteristics is that the first minor cutting edge 13 is formed so that a value of L1 satisfies the relationship:

$$L1 = \alpha \times W (0.15 \leq \alpha \leq 0.35)$$

in which W is the width of the short-side-direction side surface 5 of the cutting insert 1 (see FIG. 2) and L1 is the length of chord of the first cutting edge 13 formed into the circular arc with the radius R (see FIG. 5). The length (L1) of the chord of the first minor cutting edge 13 means the linear distance between the second end portion (S2) and the third end portion (S3) of the first minor cutting edge 13 shown in FIG. 5.

The reason why the α value is set as described above in the characteristics regarding setting of the length (L1) of the chord of the first minor cutting edge 13, is as follows.

In the planar and ramping machining in the milling of the workpiece, in order to make the properties of the machined surface favorable, for example, to control the surface roughness to be small, it is important to set the length (L1) of the chord to the adequate value. When the α value is less than 0.15, the surface roughness becomes high under the high-feed conditions where the feed per tooth fz is set to be large. This is because the height of the mountain portion which have not cut becomes large. When the α value exceeds 0.35, the length of the first minor cutting edge 13 becomes long, and in accordance with this, the length of the major cutting edge 12 becomes shorter than the width W of the insert. Therefore, the balance between the first minor cutting edge 13 and the major cutting edge 12 is worth, which may result in negative effect on the shape of chips. That is, the shape of the first minor cutting edge at the vicinity of the lowest point of the cutting tool becomes a long circular arc, and thus the region thereof making the thickness of the chips be small is increased, which may result in negative effect on the sharpness. Accordingly, in order to avoid the above-mentioned problems, it is preferable to set the α value to 0.15≤α≤0.35. The α value is more preferably 0.175≤α≤0.325, and further more preferably 0.20≤α≤0.30, but is not limited thereto.

(Indexable Rotary Cutting Tool)

Figure 8:
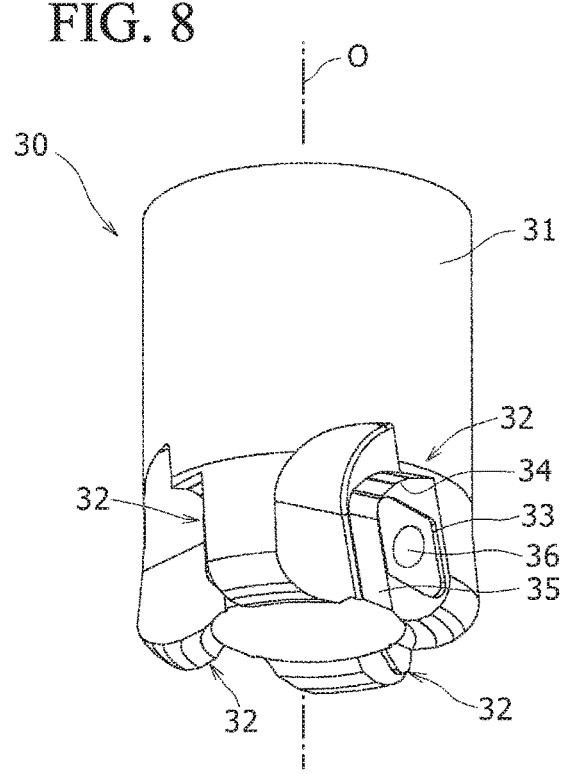
FIG. 8 is a perspective view showing the first embodiment of a indexable rotary cutting tool of the present invention to which the cutting insert according to the first embodiment of the present invention is not attached.
Figure 9:
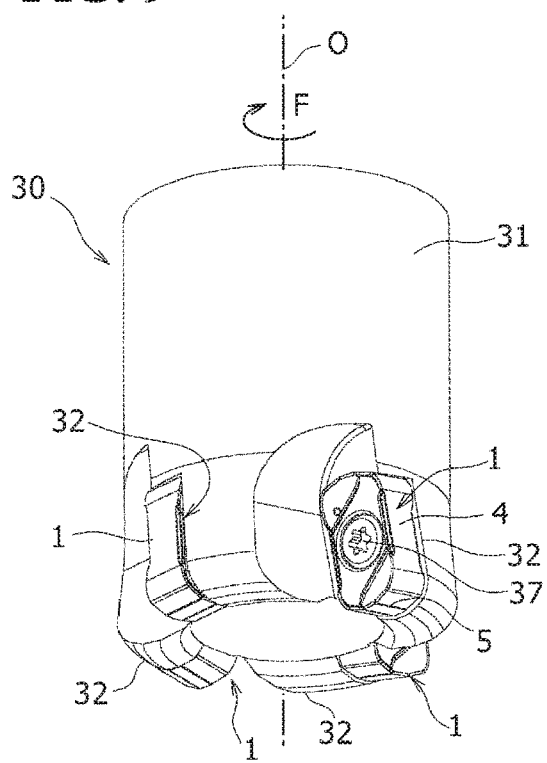
FIG. 9 is a perspective view showing the indexable rotary cutting tool shown in FIG. 8 to which the cutting insert according to the first embodiment of the present invention is attached.

Next, the indexable rotary cutting insert of the present embodiment in which the above-described cutting insert 1 is detachably attached to the tool main body, will be described with reference to FIG. 8 and FIG. 9. FIG. 8 is a perspective view of the tool main body 31 of the indexable rotary cutting tool 30 of the present embodiment, and shows a state where the cutting insert 1 is not attached to the insert mounting seat 32 provided on the tool main body 31. FIG. 9 is a perspective view showing a state where the cutting insert 1 of the present embodiment is attached to the insert mounting seat 32 shown in FIG. 8. The reference "O" shown in FIG. 8 and FIG. 9 indicates the rotational center axis of the indexable rotary cutting tool 30 (tool main body 31). When the cutting is performed on the workpiece, the indexable rotary cutting tool 30 is rotated in the F direction shown in FIG. 9.

The tool main body 31 shown in FIG. 8 (FIG. 9) shows an example where four insert mounting seats 32 are provided. As shown in FIG. 8, each of the insert mounting seats 32 includes: a seating surface 33; a short-side contact surface 34; a long-side contact surface 35; and a threaded hole 36 formed at the center portion of the seating surface 33. The seating surface 33 is a seating face to which the top surface 2 or bottom surface 3 of the cutting insert 1 is closely attached when the cutting insert 1 is attached to the insert mounting seat 32.

The short-side contact surface 34 of the insert mounting seat 32 shown in FIG. 8 is a contact surface to which the short-side-direction side surface 5 of the cutting insert 1 is closely attached when the cutting insert 1 is attached to the insert mounting seat 32. Similarly, the long-side contact surface 35 is a contact surface to which the long-side-direction side surface 4 of the cutting insert 1 is closely attached when the cutting insert 1 is attached to the insert mounting seat 32. The short-side contact surface 34 and the long-side contact surface 35 are walls for restraining, which are provided for preventing a displacement of the cutting insert 1 due to the cutting force during the cutting of the workpiece.

The four insert mounting seats 32 shown in FIG. 8 may be provided at an equal interval by 90 degrees around the rotational center axis O, and may be arranged by the angle slightly different from 90 degrees between the adjacent insert mounting seats 32, at so-called unequal interval (or unequal angle), thereby damping the vibration generated during the cutting.

FIG. 9 shows a state where the fixing screw (clamp screw) 37 as a fixing means for the cutting insert 1 is inserted through the screw insertion hole 6 provided on the cutting insert 1, the fixing screw 37 is tightened with a predetermined torque so that the treaded portion thereof is screwed with the threaded hole 36 of the seating surface 33, and thereby the cutting insert 1 is attached and firmly fixed to the insert mounting seat 32.

When the cutting insert 1 is firmly fixed to the insert mounting seat 32, as shown in FIG. 9, the short-side-direction side surface 5 of the cutting insert 1 is arranged near an end surface of the tip portion of the tool main body 31 (lower side in FIG. 9), and the long-side-direction side surface 4 is arranged near the outer periphery of the tool main body 31. Accordingly, when the cutting insert 1 is fixed to the insert mounting seat 32, the first corner edge 11a, the major cutting edge 12, the first minor cutting edge 13, and the second minor cutting edge 14 constituting the cutting edge portion 10 slightly protrude outwardly (downwardly) from the end surface of the tip portion of the tool main body 31. In addition, the first corner edge 11a slightly protrudes outwardly from the outer periphery surface of the tool main body 31. One of the long-side-direction side surfaces 4 of the cutting insert 1 also slightly protrudes outwardly from the outer periphery surface of the tool main body 31.

(Cutting Method of Workpiece)

Figure 10:
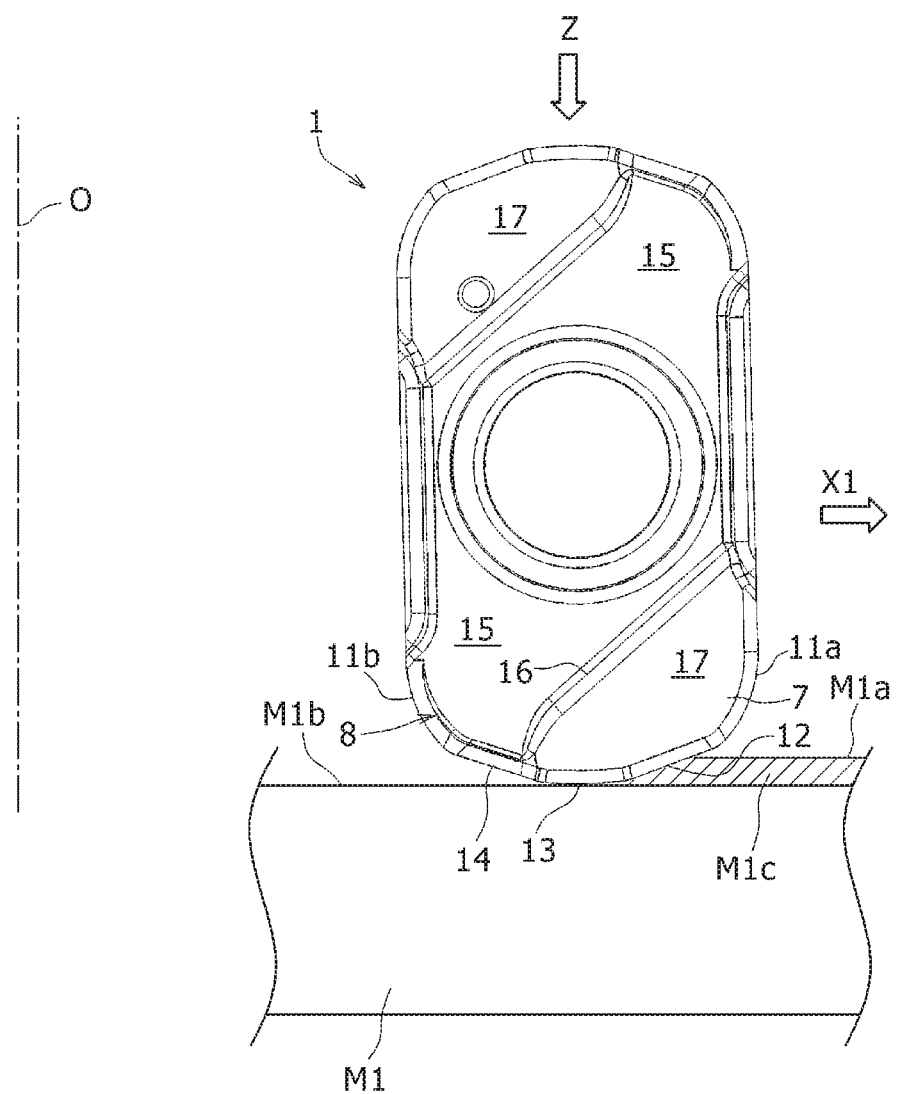
FIG. 10 shows a state where a planar machining is performed on a workpiece using the indexable rotary cutting tool shown in FIG. 9.

Next, an example of machining process when the cutting is performed on the workpiece using the indexable rotary cutting tool 30 of the present embodiment attached to a triaxial or five-axial NC cutting machine, will be described with reference to FIG. 10 to FIG. 12. FIG. 10 and FIG. 12 are drawings showing a state where the cutting is performed on the workpiece using the indexable rotary cutting tool 30 of the present embodiment, and showing one cutting insert 1 at the right side of the rotational center axis O among a plurality of the cutting insert 1 attached to the indexable rotary cutting tool 30.

(Planar Cutting)

When the high-feed planar cutting is performed on the workpiece using the indexable rotary cutting tool 30, as shown in FIG. 10, for example, while the indexable rotary cutting tool 30 is transversely fed in the X1 direction, the planar machining is performed on the surface (M1a) of the workpiece (M1). When this planar machining is performed, it is preferable to use the major cutting edge 12 and the first minor cutting edge 13 among the cutting edge portion 10 of the cutting insert 1 attached to the indexable rotary cutting tool 30. In this case, when the indexable rotary cutting tool 30 is transversely fed in X1 direction, the major cutting edge 12 functions as a cutting edge for cutting the workpiece (M1) and the first minor cutting edge 13 functions as a cutting edge for improving the surface roughness of the machined surface (M1b) which have been cut. The shaded portion shown with the reference "M1c" in FIG. 10 indicates a machining allowance.

In the planar machining of the workpiece M1, the major cutting edge 12, the first minor cutting edge 13, and the first corner edge 11a contribute to the cutting, and the breaker surface 17 as the rake face of these cutting edges tilts downwardly toward the inclined surface 16 as described above. Therefore, it is possible to limit the contact of the generated chips with the breaker surface 17 as much as possible. Thereby, the breaker surface 17 can be prevented from being worn at an early stage.

(Ramping Milling)

Next, an example of the machining process when the ramping milling is performed on the workpiece using the indexable rotary cutting tool 30 of the present embodiment, will be described. In some cases where a mold or the like is produced through the cutting, for example, cutting of a deep groove or a pocket machining is performed on the workpiece made of the raw material of the mold (various types of steel for mold). In the cutting of the deep groove or the like, in general, a method where the ramping milling on the workpiece is sequentially repeated in several times using the milling tool, is employed.

Figure 11:
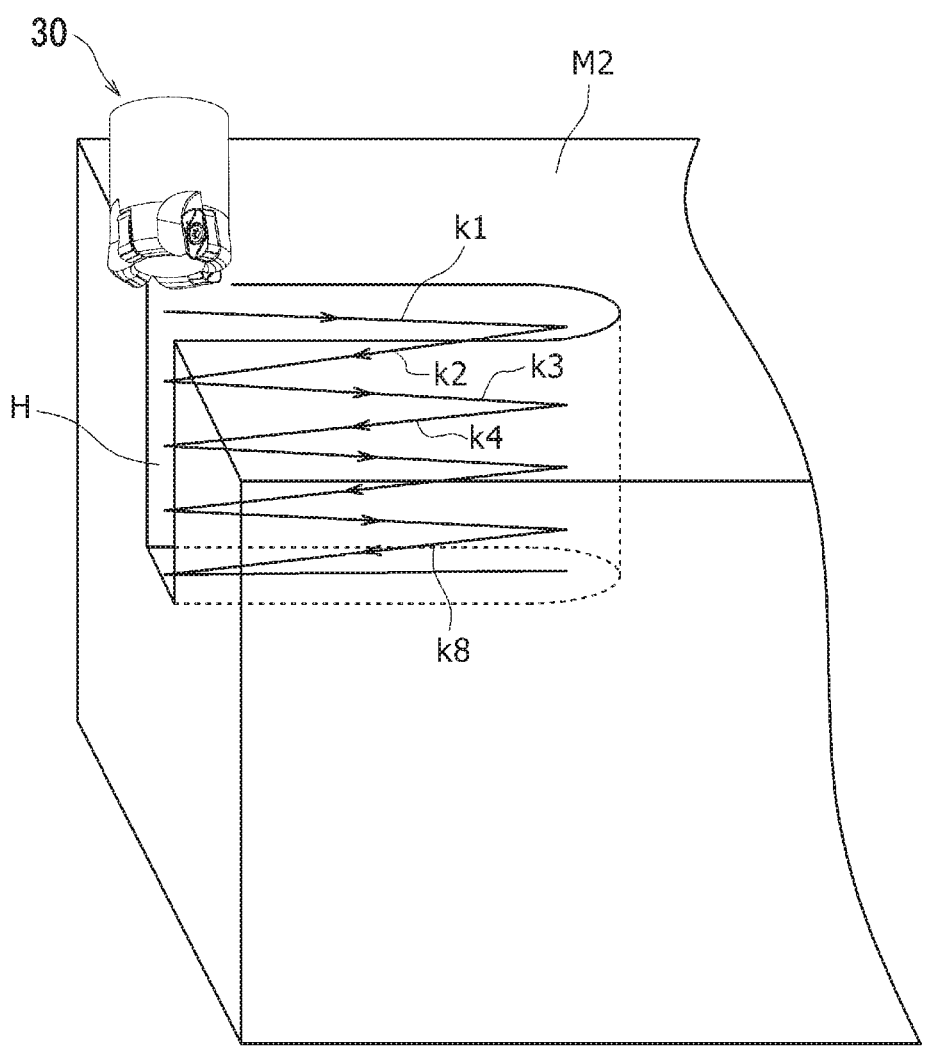
FIG. 11 shows an example of a feed control process of a milling tool in a ramping milling for cutting a deep groove on the workpiece using the milling tool.
Figure 12:
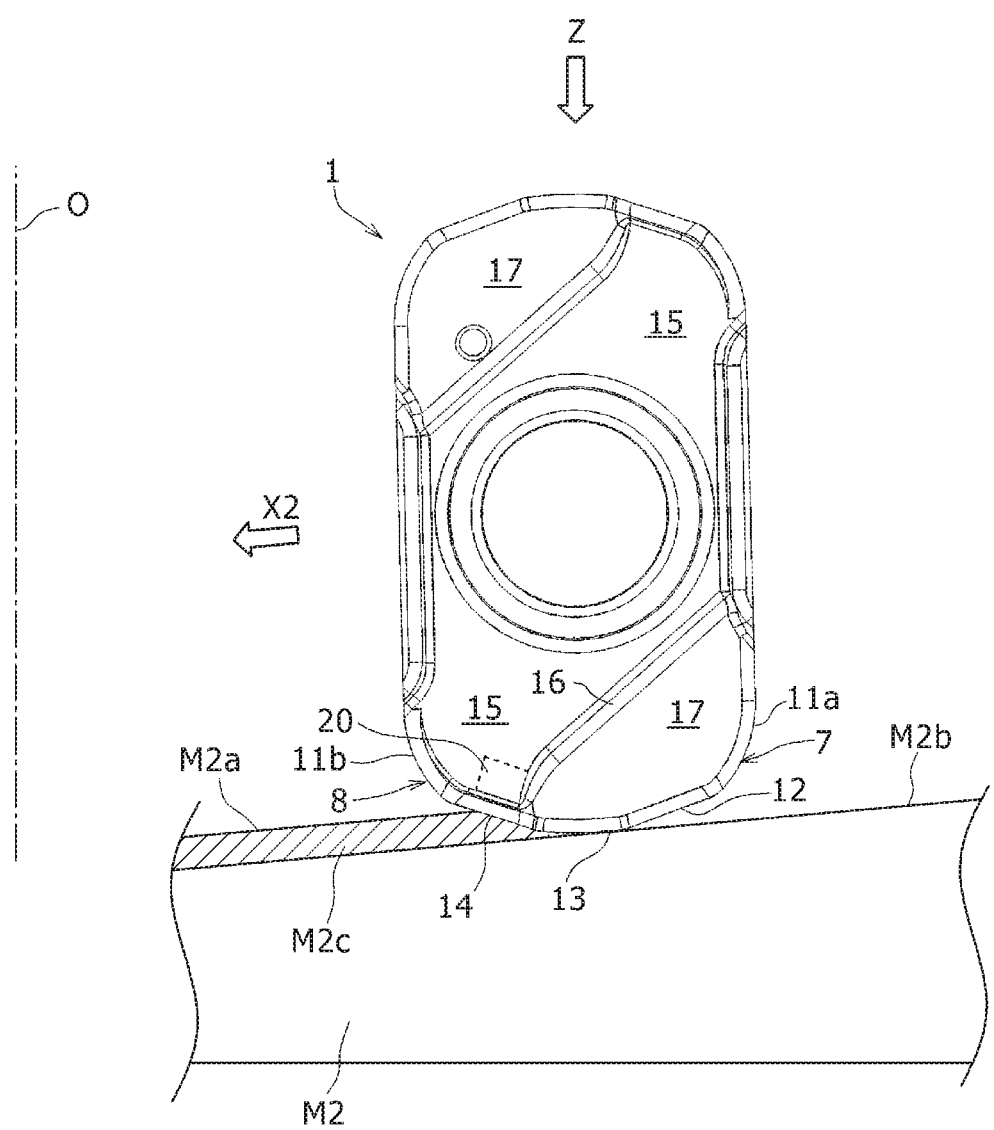
FIG. 12 shows a state where the ramping milling is being performed on the workpiece using the indexable rotary cutting tool according to the first embodiment of the present invention when the ramping milling shown in FIG. 11 is performed.

FIG. 11 shows a path of the feed control for the milling tool when the cutting of the deep groove (H) is performed on the workpiece M2 using NC cutting machine. In the example shown in FIG. 11, the ramping milling on the workpiece M2 is repeated sequentially in several times along the paths k1, k2, . . . , k8.

In a case of using the indexable rotary cutting tool 30 of the present embodiment in the ramping milling performed for producing the deep groove (H) shown in FIG. 11 through the cutting, a favorable effect of the ramping milling can be obtained. Hereafter, the operations of each cutting edge of the cutting insert 1 when the ramping milling is performed using the indexable rotary cutting tool 30 of the present embodiment, will be described.

FIG. 12 shows a state where the cutting insert 1 attached to the indexable rotary cutting tool 30 of the present embodiment is fed in the X2 direction to perform the ramping milling toward the left lower on the workpiece (M2). In FIG. 12, while simultaneously controlling the feeds in the X2 direction (transverse feed) and in the Z direction (vertical feed) by, for example, the triaxial-controlled machine, the indexable rotary cutting tool 30 performs the ramping milling on the surface (M2a) of the workpiece (M2) to obtain the ramping machined surface (M2b). Although not shown in FIG. 2, in the cutting insert 1 at the left side with respect to the rotational center axis O on the paper, the major cutting edge 12 and the first minor cutting edge 13 contribute to the cutting. The shaded portion shown with the reference "M2c" in FIG. 12 indicates a machining allowance.

In the ramping milling in the X2 direction, the second minor cutting edge 14 among the cutting edges of the cutting insert 1 contributes to the cutting as well as the major cutting edge 12 and the first minor cutting edge 13. At this time, the straight-line second minor cutting edge 14 functions as an edge for cutting into the unprocessed surface (M2a) of the workpiece M2 in the transverse feed in the X2 direction. The circular-arc first minor cutting edge 13 functions as a cutting edge for processing the machined surface which has been machined by the second minor cutting edge 14 into the favorable ramping machined surface (M2b).

In the ramping milling, the thickness of the chips generated by the cutting of the second minor cutting edge 14 is larger than that generated by the first minor cutting edge 13. However, the second minor cutting edge 14 is continuous with the reference plane 15 via the honing 18, and thus the chips flow toward the reference plane 15 without flowing toward the breaker surfaces 17, and then favorably discharged.

The reason why the chips do not flow toward the breaker surfaces 17 is that, among the reference plane 15 and the breaker surfaces 17 formed on each of the top surface 2 and the bottom surface 3, the breaker surface 17 is higher than the reference plane 15 in the thickness (T) direction of the cutting insert 1.

In the ramping milling toward the right lower (the ramping milling in a direction opposite to the X2 direction shown in FIG. 12), the major cutting edge 12, the first minor cutting edge 13, and the second minor cutting edge 14 contribute to the cutting.

As shown in FIG. 6C, the small convex portion 19 gently protruding upward is provided on the honing 18 of the second minor cutting edge 14 and the surface of the reference plane 15 near the honing 18, and thus the strength of the second minor cutting edge 14 is retained. Thereby, similar to the above-described planar machining, it is possible to prevent chipping and fracture of the second minor cutting edge 14 from occurring at an early stage, and thus obtain the favorable ramping machined surface (M2b) without unevenness.

As shown in FIG. 6C, the intersecting angle β (degree) between the line segment (E1) connecting the apex (G) of the convex portion 19 and the second minor cutting edge 14 and the extended line of the short-side-direction side surface 5 is set to be "90<β≤130" as the above-described first characteristics of the present embodiment. Therefore, it is possible to improve the chip discharge performance and prevent wear of the reference plane 15 as the rake face of the second minor cutting edge 14.

The above-described cutting insert 1 is the negative-type cutting insert formed into substantially quadrilateral and including the two first corner edge 11a on the two first corner portions 7 of each of the top surface 2 and the bottom surface 3, includes four corners in total per one cutting insert, and has the main characteristics described in the above first to fourth characteristics of the present embodiment.

Thereby, when the cutting edge or the like of the cutting insert 1 attached to the insert mounting seat 32 of the indexable rotary cutting tool 30 wears, the cutting insert 1 is turned 180 degrees and attached again, and thereby the other cutting edge portion 10 can be used in the cutting. When the two cutting edge portions 10 on the top surface 2 wears, the cutting edge portions 10 of the bottom surface 3 of the same cutting insert 1 can be used in the cutting. In this manner, the four cutting edge portion formed on the top surface 2 and the bottom surface 3 can be used in one cutting insert.

The first corner edge 11*a* of the cutting insert 1 is used as a cutting edge contributing to the cutting of the vertical wall and the corner at a lower portion of the vertical wall when the cutting of the vertical wall (the face substantially parallel to the rotational center axis of the indexable rotary cutting tool) of the workpiece is required in the planar machining of the workpiece.

(Second Embodiments)

Figure 13:
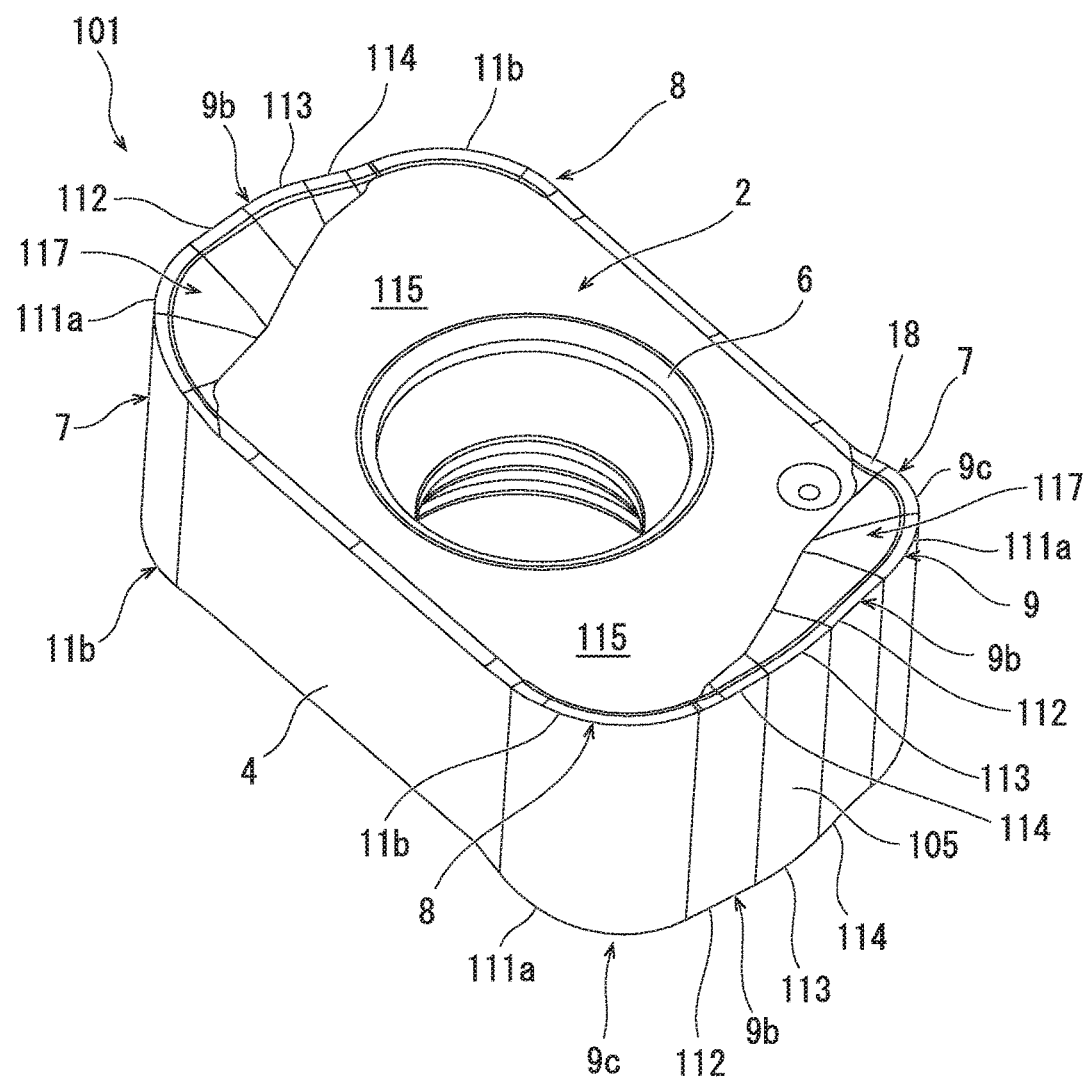
FIG. 13 is a perspective view of a cutting insert according to the second embodiment of the present invention which is viewed obliquely from up above a top surface thereof.
Figure 14:
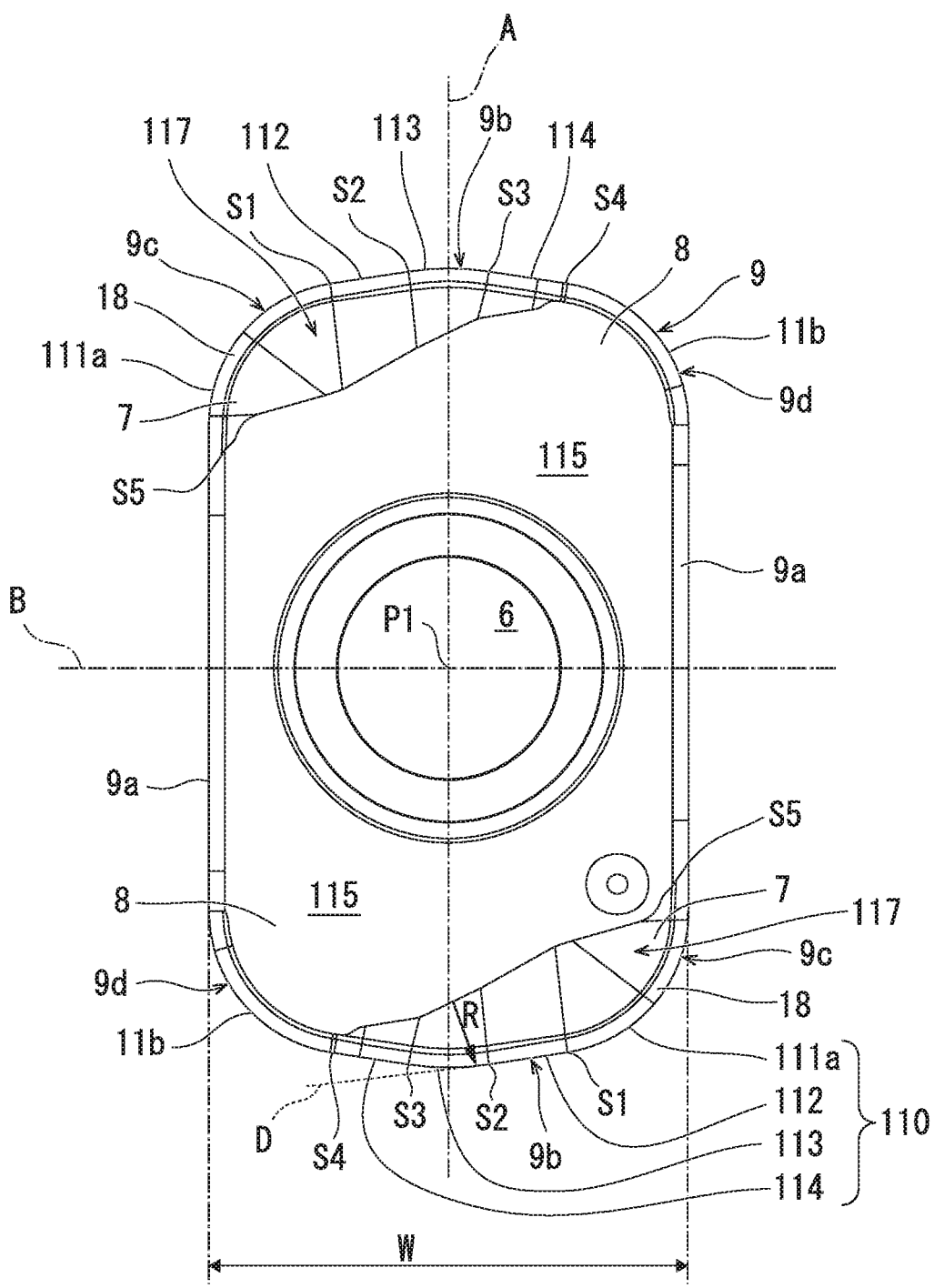
FIG. 14 is a plan view of the cutting insert shown in FIG. 13 which is viewed from the top surface thereof.
Figure 15:
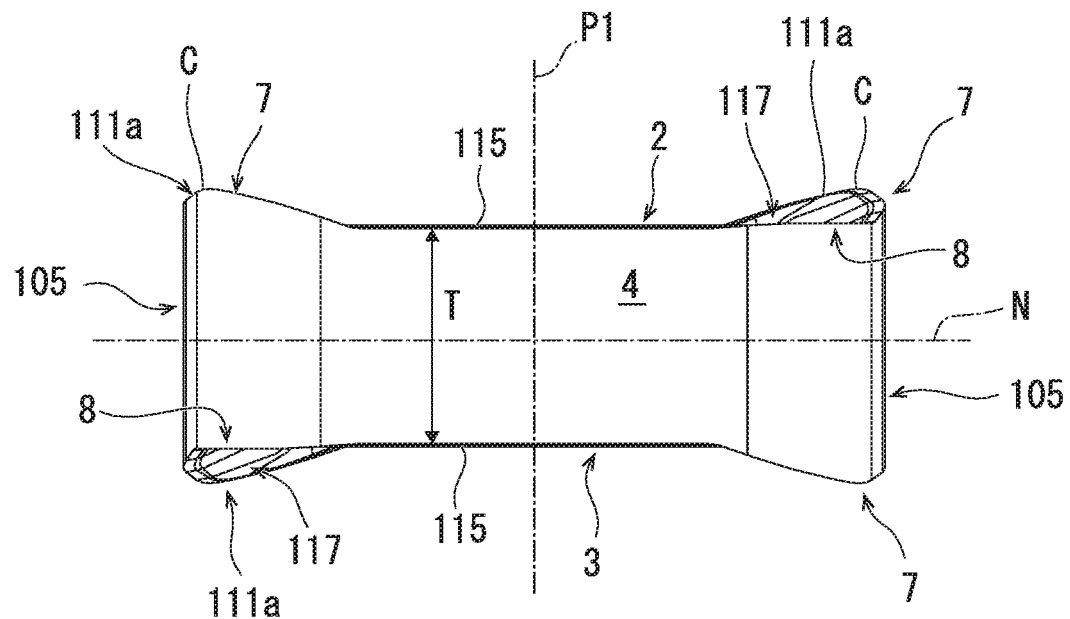
FIG. 15 is a side view of the cutting insert shown in FIG. 13 which is viewed from a long-side-direction side surface thereof.
Figure 16:
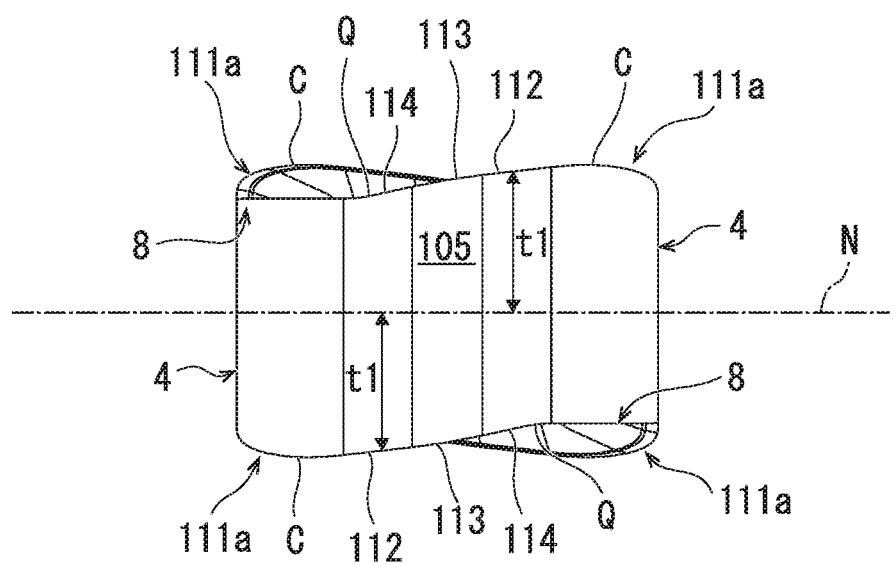
FIG. 16 is a front view of the cutting insert shown in FIG. 13 which is viewed from a short-side-direction side surface thereof.

Next, the cutting insert 101 according to the second embodiment of the present invention, and the indexable rotary cutting tool 130 including the same will be described with reference to FIG. 13 to FIG. 19. FIG. 13 is a perspective view of the cutting insert according to the present embodiment which is viewed obliquely from up above a top surface thereof. FIG. 14 is a plan view of the cutting insert shown in FIG. 13 which is viewed from the top surface thereof. FIG. 15 is a side view of the cutting insert shown in FIG. 13 which is viewed from a long-side-direction side surface thereof. FIG. 16 is a front view of the cutting insert shown in FIG. 13 which is viewed from a short-side-direction side surface thereof.

The parts common with the first embodiment is put into the same reference numerals and the descriptions thereof are simplified. In addition, regarding the parts of which reference numbers are different from the first embodiment but names are the same as in the first embodiment, the descriptions of their configurations and operations similar to the first embodiment are omitted.

In the second embodiment, the first corner edge 111*a*, the major cutting edge 112, the first minor cutting edge 113, and the second minor cutting edge 114 constituting each cutting edge portion 110 are smoothly continuous without forming a corner at the connecting portions (the first characteristics of the second embodiment). In addition, the breaker surface 117 constitutes the rake face of the cutting edge portions 110, the rake angle of the breaker surface 117 near the first corner edge 111*a* is smaller than that near the second minor cutting edge 114 (the second characteristics of the second embodiment). In the cross-section of the rake face of the second minor cutting edge 114 perpendicular to the second minor cutting edge, the apex of the convex portion 119 is located on the second minor cutting edge 114 (the third characteristics of the second embodiment). The other configurations, operations and effects thereof are similar to the first embodiment. Hereafter, the above-mentioned characteristics are described with the operations and effects thereof.

(First Characteristics)

As shown in FIGS. 13 and 14, in the cutting insert 101 according to the second embodiment, the first corner edge 111*a*, the major cutting edge 112, the first minor cutting edge 113, and the second minor cutting edge 114 constituting each cutting edge portion 110 are smoothly continuous without forming a corner at each of the connecting portions (S1, S2 and S3).

According to such configurations, no corner is formed at the end portion S1 as the boundary between the first corner edge 111*a* and the major cutting edge 112, the end portion S2 as the boundary between the major cutting edge 112 and the first minor cutting edge 113, and the end portion S3 as the boundary between the first minor cutting edge 113 and the second minor cutting edge 114. Therefore, the end portions S1 to S3 can be prevented from being damaged and preferentially worn during the cutting. As a result, the shape of the cutting edge portion 110 can be maintained for a long term and the cutting performance can be maintained.

(Second Characteristics)

Figure 17A:
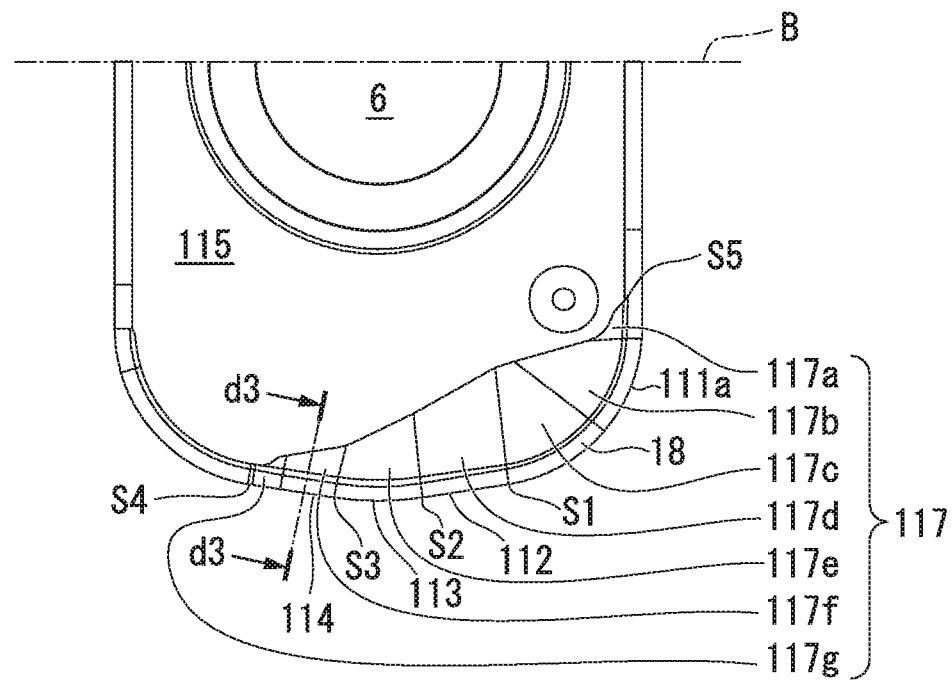
FIG. 17A is an enlarged partial plan view of the cutting insert shown in FIG. 14 showing an arrangement and an array of each cutting edge constituting the cutting edge portion.
Figure 17B:
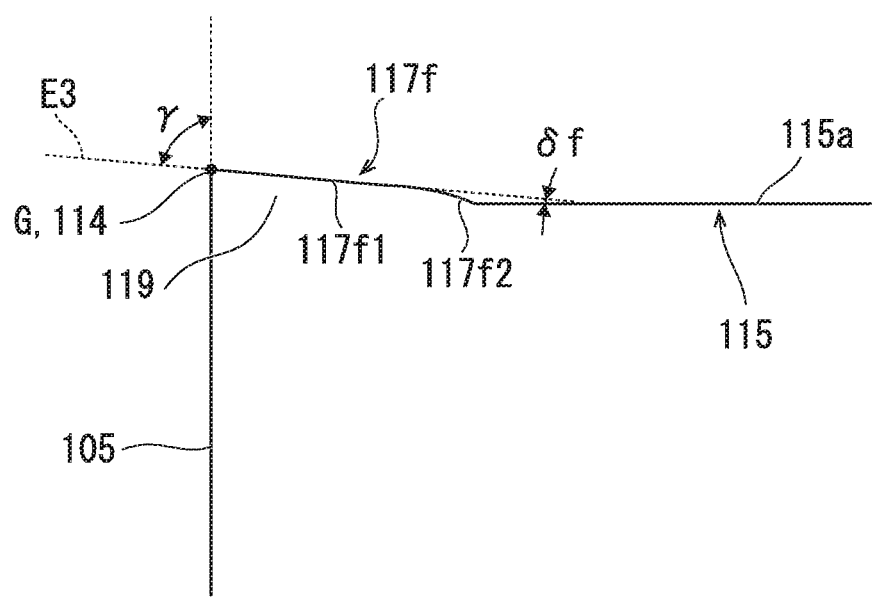
FIG. 17B is a cross-sectional view taken along a d3-d3 line shown in FIG. 17A.

In the cutting insert 101 of the present embodiment, the breaker surface 117 constitutes the rake face of the cutting edge portions 110, and the rake angle of the breaker surface 117 near the first corner edge 111*a* is smaller than that near the second minor cutting edge 114. Specifically, as shown in FIGS. 17A and 17B, each breaker surface 117 is constituted by a plurality of faces 117*a* to 117*g*. FIG. 17A is an enlarged partial plan view of the cutting insert 101 shown in FIG. 14 showing the arrangement and an array of each cutting edge constituting the cutting edge portion 110. FIG. 17B is a cross-sectional view taken along a d3-d3 line perpendicular to the second minor cutting edge 114 shown in FIG. 17A.

The face 117*a* is continuous with the first corner edge 111*a* and the reference plane 115 and passes through the end portion S5 of the first corner edge 111*a*. The face 117*b* is continuous with the face 117*a*, the first corner edge 111*a*, and the reference plane 115. The face 117*c* is continuous with the face 117*b*, the first corner edge 111*a*, and the reference plane 115. The faces 117*a*, 117*b* and 117*c* constitute a rake face of the first corner edge 111*a*. The face 117*d* is continuous with the face 117*c*, the major cutting edge 112, and the reference plane 115, and constitutes a rake face of the major cutting edge 112. The face 117*e* is continuous with the face 117*d*, the first minor cutting edge 113, and the reference plane 115, and constitutes a rake face of the first minor cutting edge 113. The face 117*f* is continuous with the face 117*e*, the second minor cutting edge 114, the reference plane 115. The face 117*g* is continuous with the face 117*f*, the second minor cutting edge 114, and the reference plane 115, and passes through the end portion S4 of the second minor cutting edge 114. The faces 117*f*, and 117*g* constitutes a rake face of the second minor cutting edge 114.

As shown in FIGS. 17A and 17B, each face 117*a* to 117*g* constituting the breaker surface 117 is constituted by mainly flat face (corresponding to a straight line described later), and is formed into the convex curved face (corresponding to a curved line described later) at the connecting portion with the reference plane 115.

As shown in FIG. 17B, in the cross-section perpendicular to the second minor cutting edge 114 and passing through the face 117*f*, the cross-sectional ridgeline of the face 117*f* includes the straight line 117*f*1 and the curved line 117*f*2. The straight line 117*f*1 extends from the second minor cutting edge 114 to the reference plane 115. The extended line E3 forms a predetermined angle δf (hereafter, also referred to as an angle between the face 117*f* and the reference plane 115) with respect to the cross-sectional ridgeline 115*a* of the reference plane 115. The curved portion 117*f*2 is a convex circular arc connecting the straight line 117*f*1 and the cross-sectional ridgeline 115*a*. The straight line 117*f*1 and the curved line 117*f*2 are protrude above the cross-sectional ridgeline 115*a*. That is, the face 117*f* protrudes above the reference plane 115.

Although FIG. 17B shows the face 117*f*, the other faces 117*a* to 117*e* and 117*g* have the similar shapes. That is, in the cross-section of the each of the faces 117*a* to 117*e* and 117*g* perpendicular to each of the cutting edges continuous therewith, each of the cross-sectional ridgelines of the faces 117*a* to 117*e* and 117*g* includes a straight line extending from the corresponding cutting edges and a curved line connecting the reference plane 115 and the straight line.

The angle of each of the faces 117*a* to 117*g* constituting the breaker surface 117 with respect to the reference plane 115 is increased from the face 117*a* to the face 117*g* in sequence. In other words, in the cross-section of each of the faces 117a to 117g perpendicular to the corresponding cutting edges continuous therewith, when the angles between the straight lines of the cross-sectional ridgelines of the faces 117a to 117g and the cross-sectional ridgeline 115a of the reference plane 115 (angle of each face 117a to 117g with respect to the reference plane 115) is referred to as δa to δg, respectively, δa<δb<δc<δd<δe<δf<δg is satisfies. That is, the breaker surface 117 is configured so that the rake face increases sequentially from the face 117a to the face 117g.

According to such configurations, the chips generated during the cutting are sent to the outside of the top surface 2 or the bottom surface 3 along the breaker surface 117, and thus are discharged quickly. Therefore, it is possible to prevent the chips from being directly contacted with the reference plane 115. That is, wear and deformation of the reference plane 115 due to contact with chips or the like can be avoided.

In order to surely exert the above-mentioned effect, the difference (δa-δg) between the angle δa of the face 117a arranged on an end of the breaker surface 117 near the first corner edge with respect to the reference plane 115 and the angle δg of the face 117a arranged on an end of the breaker surface 117 near the second minor cutting edge with respect to the reference plane 115 is preferably 3 degrees to 20 degrees, and more preferably 4 degrees to 15 degrees. The angle δa is preferably 5 degrees to 25 degrees and more preferably 10 degrees to 20 degrees. The angle δg is preferably 10 degrees to 30 degrees and more preferably 15 degrees to 25 degrees.

In addition, the shape of the breaker face 117 only has to be configured so that the rake angle thereof near the first corner edge 111a is smaller than that near the second minor cutting edge 114, and is not limited to the above descriptions. For example, the number of the faces constituting the breaker surface 117 is not limited to seven, and the breaker surface 117 may be constituted by two or more flat faces and may be constituted by one or more curved faces. In a case where the breaker surface 117 is constituted by one curved face, in the cross-section perpendicular to each cutting edge, the cross-sectional ridgeline of the breaker surface 117 include a straight line and a curved line similar to the case shown in FIG. 17B. The angle between the straight line and the cross-sectional ridgeline 115a of the reference plane 115 is gradually increased from the end of the breaker surface 117 near the first corner edge 111a to the other end near the second minor cutting edge.

(Third Characteristics)

As shown in FIG. 17B, in the present embodiment, in the cross-section of the face 117f constituting the rake face of the second minor cutting edge 114 which is perpendicular to the second minor cutting edge, the cross-sectional ridgelines 117f1 and 117f2 of the face 117f form the convex portion 119. The convex portion 119 gently protrudes above the top surface 2 with respect to the reference plane 115. The apex G of the convex portion 119 is positioned on the second minor cutting edge 114. As described above, the face 117g has the shape similar to the face 117f. The angle between the straight line of the cross-sectional ridgeline of the face 117g and the cross-sectional ridgeline 115a of the reference plane 115 is smaller than the angle between the straight line 117f1 of the cross-sectional ridgeline of the face 117f and the cross-sectional ridgeline 115a of the reference plane 115.

In this manner, since the rake faces 117f and 117g of the second minor cutting edge 114 is convex with respect to the reference plane, in the ramping milling using the second minor cutting edge 114, the chip discharge performance can be further improved. In addition, wear and deformation of the reference plane 115 due to contact with chips or the like can be avoided.

The intersecting angle γ (degrees) between the straight line 117f1 of the cross-sectional ridgeline of the face 117f (or the extended line E3 thereof) and the short-side-direction side surface 105 is set to 70 (degrees)≤γ<90 (degrees). Also regarding the face 117g, in the cross-section perpendicular to the second minor cutting edge 114 and passing through the face 117g, the intersecting angle γ (degrees) between the straight line of the cross-sectional ridgeline of the face 117g and the short-side-direction side surface 105 is set to 70 (degrees)≤γ<90 (degrees).

In this manner, since the intersecting angle γ is an acute angle, the cutting force applied to the second minor cutting edge 114 can be reduced. In addition, the adhesion of the workpiece can be prevented, and thus the cutting insert 101 is suitable for the ramping milling using the second minor cutting edge 114 on the workpiece in which adhesion easily occurs. In order to surely exert the above-mentioned effect, the intersecting angle γ is preferably 72 degrees≤γ≤88 degrees and more preferably 74 degrees≤γ≤86 degrees, but is not limited thereto.

In the entire of the cutting edge portion 110, the angle corresponding to the intersecting angle γ, that is, the angle between the straight line of the cross-sectional ridgeline of each of the faces 117a to 117g in the cross-section perpendicular to each of the cutting edges continuous with the faces 117a to 117g on the breaker surface 117 and the short-side-direction side surface 105, is preferably 70 degrees or more and less than 90 degrees. In this case, the cutting insert 101 is so-called positive-type cutting insert.

According to such configurations, the cutting force of the entire of the cutting edge portions 110 can be reduced. Therefore, by smoothly connecting the cutting edges with each other as in the first characteristics of the present embodiment, the chatter vibration of the tool can be prevented even if the contact area between the short-side contact surface 34 of the insert mounting seat 32 and the short-side-direction side surface 105 is smaller than that in the first embodiment. In addition, since the adhesion of the workpiece can be prevented, the cutting insert 101 is suitable for cutting of the workpiece in which adhesion easily occurs.

(Cutting of Vertical Wall)

Figure 18:
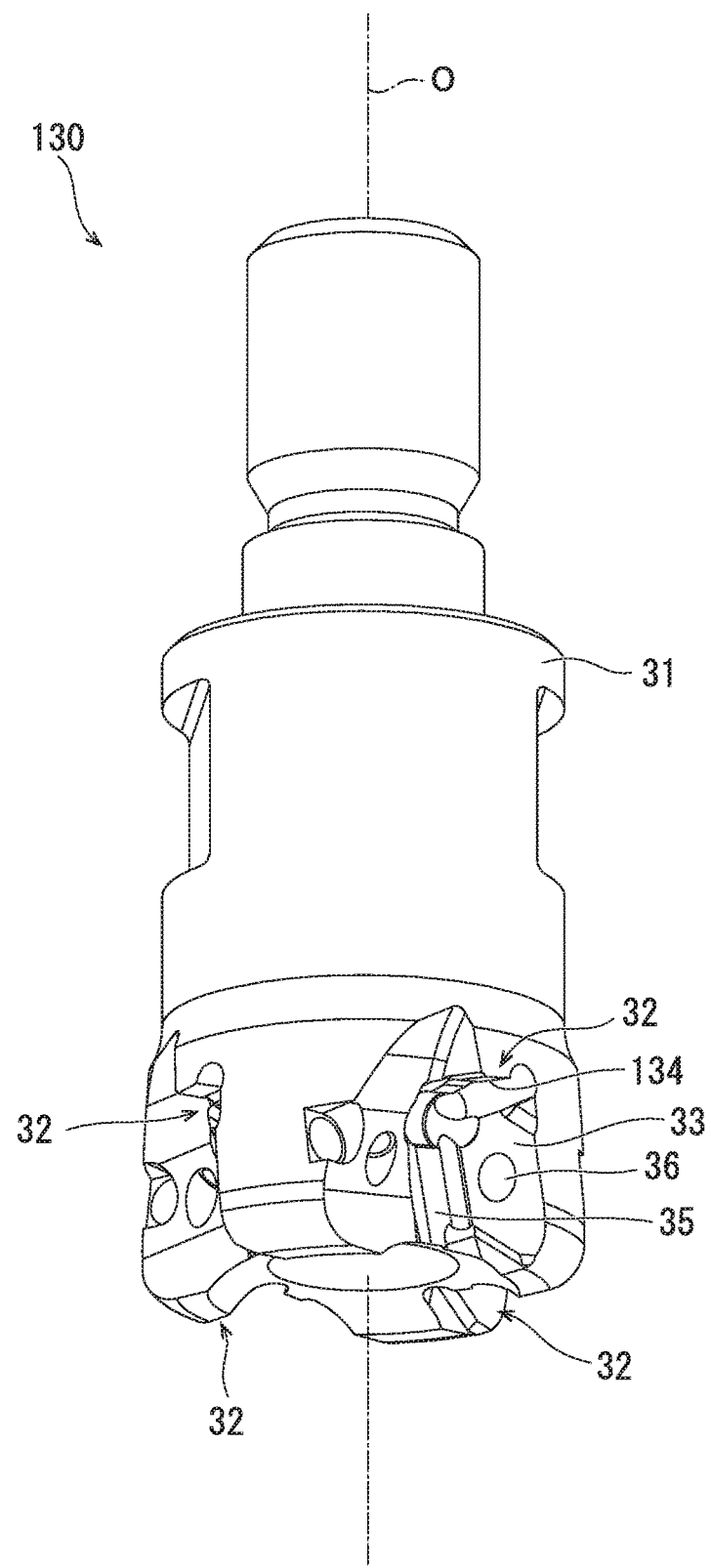
FIG. 18 is a perspective view showing the second embodiment of an indexable rotary cutting tool of the present invention to which the cutting insert according to the second embodiment of the present invention is not attached.
Figure 19:
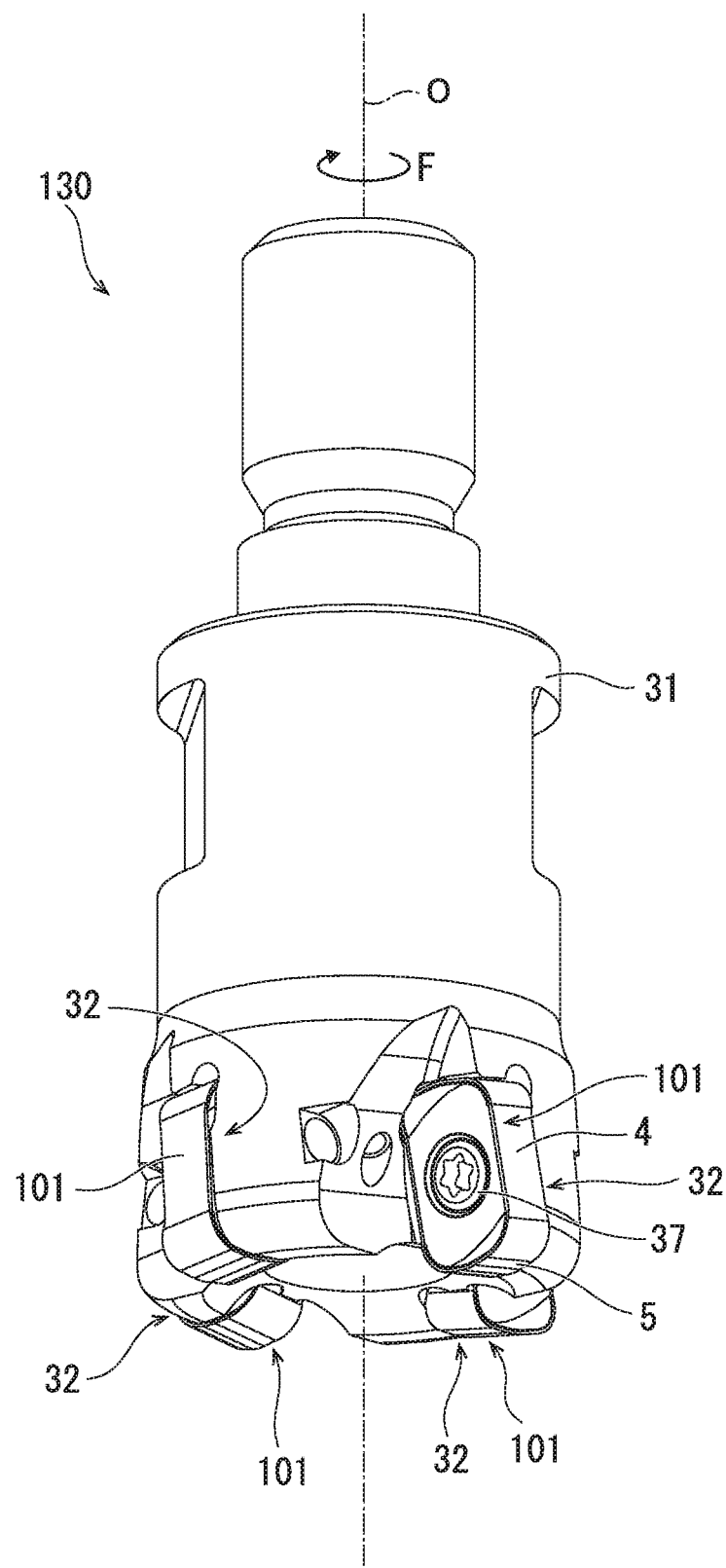
FIG. 19 is a perspective view showing the indexable rotary cutting tool shown in FIG. 18 to which the cutting insert according to the second embodiment of the present invention is attached.

Next, the indexable rotary cutting tool 130 of the present embodiment in which the above mentioned cutting insert 101 is detachably attached to the tool main body 31 and the usage example thereof will be described with reference to FIG. 18 to FIG. 20. FIGS. 18 and 19 are perspective view of the indexable rotary cutting tool of the present embodiment. FIG. 18 shows a state where the cutting insert of the present embodiment is not attached. FIG. 19 shows a state where the cutting insert of the present embodiment is attached. The configurations of the indexable rotary cutting tool 130 of the present embodiment is the same as those in the first embodiment, except that the shape of the short-side contact surface 134 of the insert mounting seat 32 is a shape corresponding to the short-side-direction side surface 10 of the cutting insert 101 of the present embodiment.

Figure 20:
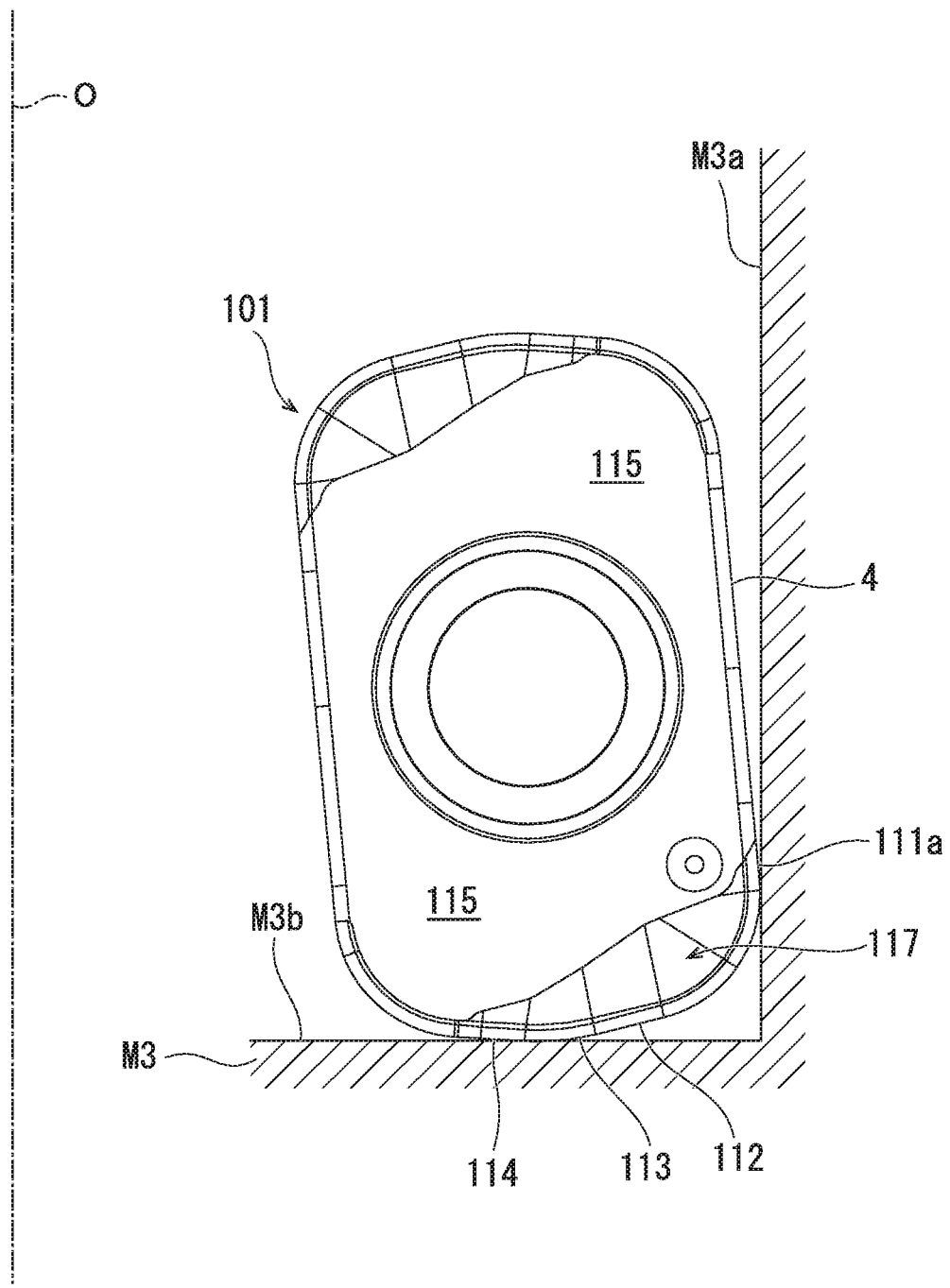
FIG. 20 shows a state of cutting a corner portion of a workpiece including a vertical wall using the indexable rotary cutting tool shown in FIG. 19.

The indexable rotary cutting tool 130 of the present embodiment is advantageous particularly in the cutting of the vertical wall of the workpiece and the corner at a lower portion of the vertical wall shown in FIG. 20. FIG. 20 is a drawing showing a state where the cutting of the corner of the workpiece M3 including the vertical wall M3a is performed using the indexable rotary cutting tool 130 shown in FIG. 19.

According to the indexable rotary cutting tool 130 of the present embodiment, since the cutting insert 101 has the second and the third characteristics of the present embodiment, the chips generated during the cutting can be sent to radially inward of the indexable rotary cutting tool 130 (the left side of the cutting insert 101 in FIG. 20) along the breaker surface 117. Therefore, it is possible to prevent the chips from being involved between the long-side-direction side surface 4 of the cutting insert 101 and the vertical wall M3a of the workpiece M3. In addition, since the breaker surface 117 extends to the end portion S4 of the second minor cutting edge 114, the chips generated during the cutting is sent to radially inward with respect to the second minor cutting edge 114 along the breaker surface 117. Therefore, it is possible to prevent the chips from being involved between the cutting edge portion 110 and the plane M3b of the workpiece M3. As a result, the increase in the cutting force caused by involving the chips can be prevented and the vertical wall M3 and the plane M3b can be prevented from being scratched by the chips.

In the above description of the cutting insert according to the present invention, the cutting insert 1 including the top surface 2 and the bottom surface 3 formed into a substantially quadrilateral is described. However, it can be applied to the cutting insert including the top surface 2 and the bottom surface 3 formed into a triangle, pentagon, hexagon or the like.

It is preferable that the cutting insert according to the present invention is made of a tungsten carbide-cobalt base (WC-Co base) cemented carbide. However, other than the tungsten carbide-cobalt base cemented carbide, a cemented carbide containing carbonitride base cermet, a high-speed steel, a titanium carbide, a silicon carbide, a silicon nitride, an aluminum nitride, an aluminum oxide, a ceramic made of a mixture of them, a cubic boron nitride sintered body, a diamond sintered body, and an ultrahigh-pressure sintered body formed by sintering a hard phase made of a polycrystalline diamond or cubic boron nitride and a bonded phase of ceramic, iron group metal, or the like under an ultrahigh pressure, can be used.

In the cutting insert of the present invention, it is preferable that one or more layers of various type of hard films conventionally formed through PVD or the like to improve the wear resistance is formed on a region including at least the cutting edge ridgelines of the cutting edge portions and the honing.

The cutting insert of the present invention is not limited to the above-described embodiments. The configurations (constituent elements) described in the above-described embodiments may be combined within a scope which does not depart from the gist of the present invention, and addition, omission, replacement, or other modification of the configurations are possible. Moreover, the present invention is not limited by the above-described embodiments and is limited only by the claims.

For example, the third characteristics of the cutting insert according to the second embodiment may be replaced with the first characteristics of the first embodiment. According to also such configurations, the favorable chip discharge performances during the ramping milling can be obtained. In the second embodiment, the inflection point Q on the second minor cutting edge 114 may be positioned so as to have the third characteristics of the first embodiment. Further, although not shown in the drawings and not described, in the second embodiment, the cutout portion 21 with a predetermined length may be provided along the intersecting ridgeline 9a as in the first embodiment.

Each of the end portions S1 to S5 is a region with a small width in the first embodiment and is a point in the second embodiment, but is not limited thereto. The end portion S1 only has to be a boundary between the first corner edge and the major cutting edge, the end portion S2 only has to be a boundary between the major cutting edge and the first minor cutting edge, the end portion S3 only has to be a boundary between the first minor cutting edge and the second minor cutting edge, the end portion S4 only has to be positioned at the end portion of the second minor cutting edge opposite to the end portion S3, and the end portion S5 only has to be positioned at the end portion of the first corner edge opposite to the end portion S1.

INDUSTRIAL APPLICABILITY

The cutting insert of the present invention has a favorable chip discharge performance. Therefore, according to the indexable rotary cutting tool having the cutting insert, since the cutting force can be reduced, the chatter vibration of the tool can be reduced and the surface roughness of the machined surface can be improved. In this manner, according to the cutting insert and the indexable rotary cutting tool of the present invention, the favorable machined surface can be obtained even in the high-feed ramping milling.

REFERENCE SIGNS LIST

1: cutting insert
2: top surface
3: bottom surface
4: long-side-direction side surface
5, 105: short-side-direction side surface
6: clamp screw insertion hole (screw insertion hole)
7: first corner portion
8: second corner portion
9: intersecting ridgeline
9a: intersecting ridgeline in long-side direction, 9b: intersecting ridgeline in short-side direction
9c, 9d: intersecting ridgeline of corner portion
10, 110: cutting edge portion
11a, 111a: first corner edge
11b: second corner ridgeline
12, 112: major cutting edge
13, 113: first minor cutting edge
14, 114: second minor cutting edge
15, 115: reference plane
15a (115a): cross-sectional ridgeline of top surface in cross-section of reference plane taken along d1-d1 line (d3-d3 line) of second minor cutting edge
16: inclined surface
17, 117: breaker surface
17a: cross-sectional ridgeline of top surface in cross-section of breaker surface taken along d2-d2 line of first minor cutting edge
18: honing
19, 119: small convex portion
21: cutout portion
30, 130: indexable rotary cutting tool
31: tool main body
32: insert mounting seat
33: seating surface
34, 134: short-side contact surface
35: long-side contact surface 36: threaded hole
37: fixing screw (clamp screw)
A: straight line bisecting width between two short-side-direction side surface and passing through center line of screw insertion hole in plan view of cutting insert
B: straight line passing through center line P1 of screw insertion hole and orthogonal to straight line A
C: center portion of circular arc of first corner edge
D: extended line of major cutting edge
E1: line segment connecting apex G of small convex portion and second minor cutting edge
E2: extended line of cross-sectional ridgeline of reference plane on top surface
E3: extended line of straight line of cross-sectional ridgeline of breaker surface
F: rotational direction of indexable rotary cutting tool
G: apex of small convex portion 19
H: deep groove
L1: distance from end portion (S3) to predetermined position on second minor cutting edge
L2: length of chord of circular arc on first minor cutting edge formed into circular arc
J: ellipse
M, M1, M2: workpiece
N: plane bisecting cutting insert in thickness direction
O: rotational center axis
P1: center line of screw insertion hole
R: radius of circular arc of first minor cutting edge formed into circular arc
Q: predetermined position on second minor cutting edge
W: width of short-side-direction side surface
k1, k2, . . . : feed path of ramping milling using rotary cutting tool
S1: first end portion of first corner edge near short-side-direction side surface
S2: second end portion of major cutting edge
S3: third end portion of first minor cutting edge
S4: fourth end portion of intersecting ridgeline of second corner portion
S5: fifth end portion of first corner edge (end portion near long-side-direction side surface)
β: intersecting angle between line segment (E1) connecting apex (G) of small convex portion and second minor cutting edge and extended line of short-side-direction side surface
γ: intersecting angle between extended line (E3) of straight line of cross-sectional ridgeline of breaker surface and extended line of short-side-direction side surface
δf: angle between extended line (E3) of straight line of cross-sectional ridgeline of breaker surface and cross-sectional ridgeline of reference plane
T: thickness of cutting insert
t1: distance between arbitrary position on cutting edge portion and plane bisecting cutting insert in thickness direction

The invention claimed is:

1. A cutting insert comprising:
   a top surface and a bottom surface each having long sides and short sides and each formed into substantially quadrilateral in a plan view of the top surface and the bottom surface, the bottom surface being arranged to be opposite to the top surface;
   corner portions formed at four corners of each of the top surface and the bottom surface;
   two long-side-direction side surfaces and two short-side-direction side surfaces which are side surfaces connecting the top surface and the bottom surface;
   a clamp screw insertion hole penetrating from a center portion of the top surface to the bottom surface; and
   cutting edge portions having cutting edges at intersecting ridgelines at which the top surface and the bottom surface intersect with the long-side-direction side surfaces and the short-side-direction side surfaces,
   wherein the cutting edge portions comprises:
      first corner edges formed at a pair of first corner portions among the four corners of each of the top surface and the bottom surface, the pair of the first corner portions being arranged so as to face each other across a center line of the clamp screw insertion hole;
      major cutting edges connected with first end portions (S1) of the first corner edges near the short-side-direction side surface and each formed into a straight line along the intersecting ridgeline of the short-side-direction side surface;
      first minor cutting edges connected with second end portions (S2) of the major cutting edges, each gently protruding toward outside of the short-side-direction side surface in the plan view of the top surface and the bottom surface, each extending away from the second end portion (S2) so as to gradually retract toward the clamp screw insertion hole with respect to an extended line of the major cutting edge, and each formed into a circular arc with a radius R; and
      second minor cutting edges connected with third end portions (S3) of the first minor cutting edges and each formed into a straight line,
   wherein the top surface and the bottom surface each comprise a reference plane formed to include a circumference of an opening of the clamp screw insertion hole,
   wherein in a cross-sectional view of a rake face of the second minor cutting edge perpendicular to a ridgeline of the second minor cutting edge, a cross-sectional ridgeline of the rake face of the second minor cutting edges is formed into a convex shape protruding above the top surface or the bottom surface with respect to a cross-sectional ridgeline of the reference plane,
   wherein the top surface and the bottom surface each comprise a breaker surface which constitutes a rake face of the cutting edge portion and is continuous with the reference plane, and
   wherein an angle between the breaker surface and the reference plane near the first corner edge is smaller than that near the second minor cutting edge.

2. The cutting insert according to claim 1,
   wherein the first corner edge, the major cutting edge, the first minor cutting edge, and the second minor cutting edge are smoothly continuous.

3. The cutting insert according to claim 2,
   wherein the top surface and the bottom surface each comprise a breaker surface which constitutes a rake face of the cutting edge portion and is continuous with the reference plane, and
   wherein in the cross-sectional view of the rake face of the second minor cutting edge, an apex of the convex shape is on the second minor cutting edge, and an intersecting angle γ satisfies 70 (degrees)≤γ<90 (degrees) in which the intersecting angle γ is formed between a plane in the breaker surface and the short-side-direction side surface.

4. An indexable rotary cutting tool comprising:
a tool main body; and
the cutting insert according to claim 2 detachably attached to an insert mounting seat formed at a tip portion of the tool main body by a fixing mean,
wherein the cutting insert is attached to the insert mounting seat such that the short-side-direction side surface is disposed near a base surface of the tip portion of the tool main body and the long-side-direction side surface is disposed near an outer periphery surface of the tip portion of the tool main body.

5. The cutting insert according to claim 1,
wherein the top surface and the bottom surface each comprise a breaker surface which constitutes a rake face of the cutting edge portion and is continuous with the reference plane, and
wherein in the cross-sectional view of the rake face of the second minor cutting edge, an apex of the convex shape is on the second minor cutting edge, and an intersecting angle γ satisfies 70 (degrees)≤γ<90 (degrees) in which the intersecting angle γ is formed between a plane in the breaker surface and the short-side-direction side surface.

6. An indexable rotary cutting tool comprising:
a tool main body; and
the cutting insert according to claim 1 detachably attached to an insert mounting seat formed at a tip portion of the tool main body by a fixing mean,
wherein the cutting insert is attached to the insert mounting seat such that the short-side-direction side surface is disposed near a base surface of the tip portion of the tool main body and the long-side-direction side surface is disposed near an outer periphery surface of the tip portion of the tool main body.

7. A cutting insert comprising:
a top surface and a bottom surface each having long sides and short sides and each formed into substantially quadrilateral in a plan view of the top surface and the bottom surface, the bottom surface being arranged to be opposite to the top surface;
corner portions formed at four corners of each of the top surface and the bottom surface;
two long-side-direction side surfaces and two short-side-direction side surfaces which are side surfaces connecting the top surface and the bottom surface;
a clamp screw insertion hole penetrating from a center portion of the top surface to the bottom surface; and
cutting edge portions having cutting edges at intersecting ridgelines at which the top surface and the bottom surface intersect with the long-side-direction side surfaces and the short-side-direction side surfaces,
wherein the cutting edge portions comprises:
first corner edges formed at a pair of first corner portions among the four corners of each of the top surface and the bottom surface, the pair of the first corner portions being arranged so as to face each other across a center line of the clamp screw insertion hole;
major cutting edges connected with first end portions (S1) of the first corner edges near the short-side-direction side surface and each formed into a straight line along the intersecting ridgeline of the short-side-direction side surface;
first minor cutting edges connected with second end portions (S2) of the major cutting edges, each gently protruding toward outside of the short-side-direction side surface in the plan view of the top surface and the bottom surface, each extending away from the second end portion (S2) so as to gradually retract toward the clamp screw insertion hole with respect to an extended line of the major cutting edge, and each formed into a circular arc with a radius R; and
second minor cutting edges connected with third end portions (S3) of the first minor cutting edges and each formed into a straight line,
wherein the top surface and the bottom surface each comprise a reference plane formed to include a circumference of an opening of the clamp screw insertion hole,
wherein in a cross-sectional view of a rake face of the second minor cutting edge perpendicular to a ridgeline of the second minor cutting edge, a cross-sectional ridgeline of the rake face of the second minor cutting edges is formed into a convex shape protruding above the top surface or the bottom surface with respect to a cross-sectional ridgeline of the reference plane, and
wherein the rake face of the second minor cutting edge is the reference plane.

8. The cutting insert according to claim 7,
wherein in the convex shape in the cross-sectional view of the rake face of the second minor cutting edge,
wherein an intersecting angle β satisfies 90 (degrees) <β≤130 (degrees) in which the intersecting angle β is formed between the short-side-direction side surface and a line segment (E1) connecting an apex (G) of the convex shape and the ridgeline of the second minor cutting edge.

9. The cutting insert according to claim 7,
wherein in the top surface or the bottom surface, a center portion of the first corner edge is the highest in a thickness direction of the cutting insert, and
wherein in a front view of the cutting insert, the cutting edge portion is formed so as to continuously tilt downward to a predetermined position (Q) on the second minor cutting edge from the center portion of the first corner edge.

10. The cutting insert according to claim 7,
wherein a distance (L2) from the third end portion (S3) of the first minor cutting edge to the predetermined position (Q) on the second minor cutting edge satisfies L2<0.2×L1 in which L1 is a length of a chord of the first minor cutting edge formed into the circular arc.

11. The cutting insert according to claim 7,
wherein the top surface and the bottom surface each comprise:
a breaker surface constituting rake faces of the first corner edge, the major cutting edge, and the first minor cutting edge; and
the reference plane formed such that inclined surfaces are interposed at boundary portions between the reference plane and the breaker surface, and
wherein in the top surface or the bottom surface, the inclined surfaces are lower than the reference plane in a thickness direction of the cutting insert.

12. The cutting insert according to claim 11,
wherein in a cross-sectional view of the cutting insert perpendicular to the first minor cutting edge, a cross-sectional ridgeline of the breaker surface protrudes above the top surface or the bottom surface with respect to the cross-sectional ridgeline of the reference plane.

13. An indexable rotary cutting tool comprising:
a tool main body; and
the cutting insert according to claim 7 detachably attached to an insert mounting seat formed at a tip portion of the tool main body by a fixing mean,
wherein the cutting insert is attached to the insert mounting seat such that the short-side-direction side surface is disposed near a base surface of the tip portion of the tool main body and the long-side-direction side surface is disposed near an outer periphery surface of the tip portion of the tool main body.

* * * * *